United States Patent
Varkey et al.

(10) Patent No.: US 11,387,014 B2
(45) Date of Patent: Jul. 12, 2022

(54) TORQUE-BALANCED, GAS-SEALED WIRELINE CABLES

(71) Applicant: Schlumberger Technology Corporation, Sugar Land, TX (US)

(72) Inventors: Joseph Varkey, Sugar Land, TX (US); Sheng Chang, Sugar Land, TX (US); Byong Jun Kim, Sugar Land, TX (US); Jushik Yun, Sugar Land, TX (US); Burcu Unal Altintas, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/113,705

(22) Filed: Aug. 27, 2018

(65) Prior Publication Data

US 2018/0366240 A1 Dec. 20, 2018

Related U.S. Application Data

(63) Continuation-in-part of application No. 15/214,703, filed on Jul. 20, 2016, now abandoned, which is a
(Continued)

(51) Int. Cl.
*H01B 7/22* (2006.01)
*H01B 7/04* (2006.01)
(Continued)

(52) U.S. Cl.
CPC .......... *H01B 7/046* (2013.01); *H01B 7/1895* (2013.01); *H01B 7/285* (2013.01); *H01B 13/02* (2013.01);
(Continued)

(58) Field of Classification Search
CPC ..... H01B 7/221; H01B 9/025; H01B 11/1041
(Continued)

(56) References Cited

U.S. PATENT DOCUMENTS

| | | |
|---|---|---|
| 1,948,439 A | 2/1934 | Budscheid |
| 1,973,091 A | 9/1934 | Miller |

(Continued)

FOREIGN PATENT DOCUMENTS

| | | |
|---|---|---|
| CN | 2755741 Y | 2/2006 |
| CN | 201327731 Y | 10/2009 |

(Continued)

OTHER PUBLICATIONS

Examination Report issued n the related CA application 2774775, dated Aug. 16, 2016, (3 pages).
(Continued)

*Primary Examiner* — Chau N Nguyen
(74) *Attorney, Agent, or Firm* — Ashley E. Brown

(57) ABSTRACT

A smooth torque balanced cable that includes an electrically conductive cable core for transmitting electrical power. The smooth torque balanced cable also has a first polymer surrounding said cable core. An inner layer of a plurality of first armor wires surrounds the cable core. The first armor wires being in partial contact with the first polymer and partial contact with a second polymer disposed opposite the first polymer.

12 Claims, 12 Drawing Sheets

Related U.S. Application Data continuation of application No. 12/425,439, filed on Apr. 17, 2009, now Pat. No. 9,412,492, application No. 16/113,705, filed on Aug. 27, 2018, which is a continuation-in-part of application No. 15/617,270, filed on Jun. 8, 2017, now Pat. No. 10,240,416, which is a continuation of application No. 14/705,094, filed on May 6, 2015, now Pat. No. 9,677,359, which is a continuation of application No. 13/497,142, filed as application No. PCT/US2010/049783 on Sep. 22, 2010, now Pat. No. 9,027,657, application No. 16/113,705, filed on Aug. 27, 2018, which is a continuation-in-part of application No. 15/180,789, filed on Jun. 13, 2016, now abandoned, which is a continuation of application No. 13/702,919, filed as application No. PCT/US2011/039879 on Jun. 9, 2011, now Pat. No. 9,368,260.

(60) Provisional application No. 61/277,219, filed on Sep. 22, 2009, provisional application No. 61/397,255, filed on Jun. 9, 2010.

(51) Int. Cl.
*H01B 7/285* (2006.01)
*H01B 7/18* (2006.01)
*H01B 13/24* (2006.01)
*H01B 13/02* (2006.01)

(52) U.S. Cl.
CPC .............. *H01B 13/24* (2013.01); *Y02A 30/14* (2018.01); *Y10T 29/49117* (2015.01)

(58) Field of Classification Search
USPC ........................................ 174/102 R, 106 R
See application file for complete search history.

(56) References Cited

U.S. PATENT DOCUMENTS

| | | |
|---|---|---|
| 1,995,071 A | 3/1935 | Mackenzie |
| 2,002,061 A | 5/1935 | House |
| 2,003,001 A | 5/1935 | Leece |
| 2,118,629 A * | 5/1938 | Waldron ................. H01B 7/18 174/103 |
| 2,576,227 A | 11/1951 | Hutchins, Jr. |
| 2,604,509 A | 7/1952 | Blanchard |
| 3,115,542 A | 12/1963 | Giuseppe |
| 3,127,083 A | 3/1964 | Guyer |
| 3,217,083 A | 11/1965 | Gore |
| 3,259,675 A | 7/1966 | Bowers |
| 3,313,346 A | 4/1967 | Cross |
| 3,328,140 A | 6/1967 | Warren |
| 3,346,045 A | 10/1967 | Knapp |
| 3,482,034 A | 12/1969 | Rhoades |
| 3,490,125 A | 1/1970 | Frieling, Jr. |
| 3,554,284 A | 1/1971 | Nystrom |
| 3,567,879 A | 3/1971 | Dueker |
| 3,573,349 A | 4/1971 | Bowers |
| 3,634,607 A | 1/1972 | Coleman |
| 3,679,812 A | 7/1972 | Owens |
| 3,681,514 A | 8/1972 | Rhoades |
| 3,710,859 A | 1/1973 | Hanes |
| 3,758,704 A | 9/1973 | Naud |
| 3,766,307 A | 10/1973 | Andrews, Jr. |
| 4,016,942 A | 4/1977 | Wallis, Jr. et al. |
| 4,059,951 A | 11/1977 | Roe |
| 4,077,022 A | 2/1978 | Pitts, Jr. |
| 4,131,757 A | 12/1978 | Felkel |
| 4,131,758 A | 12/1978 | Felkel |
| 4,197,423 A | 4/1980 | Fusen |
| 4,250,351 A | 2/1981 | Bridges |
| 4,259,544 A | 3/1981 | Litauer |
| 4,281,716 A | 8/1981 | Hall |
| 4,292,588 A | 9/1981 | Smith |
| 4,409,431 A | 10/1983 | Rath |
| 4,486,252 A | 12/1984 | Lloyd |
| 4,522,464 A | 6/1985 | Thompson et al. |
| 4,523,804 A | 6/1985 | Thompson |
| 4,525,813 A | 6/1985 | Burrage |
| 4,547,774 A | 10/1985 | Gould |
| 4,577,693 A | 3/1986 | Graser |
| 4,606,604 A | 8/1986 | Soodak |
| 4,644,094 A | 2/1987 | Hoffman |
| 4,645,298 A | 2/1987 | Gartside, III |
| 4,673,041 A | 6/1987 | Turner et al. |
| 4,675,474 A | 6/1987 | Neuroth |
| 4,696,542 A | 9/1987 | Thompson |
| 4,722,589 A | 2/1988 | Priaroggia |
| 4,729,629 A | 3/1988 | Saito et al. |
| 4,743,711 A | 5/1988 | Hoffman |
| 4,762,180 A | 8/1988 | Wybro et al. |
| 4,768,984 A | 9/1988 | de Oliveira et al. |
| 4,825,953 A | 5/1989 | Wong et al. |
| 4,830,113 A | 5/1989 | Geyer |
| 4,899,823 A | 2/1990 | Cobb et al. |
| 4,952,012 A | 8/1990 | Stamnitz |
| 4,979,795 A | 12/1990 | Mascarenhas |
| 4,986,360 A | 1/1991 | Laky et al. |
| 4,993,492 A | 2/1991 | Cressey et al. |
| 5,002,130 A | 3/1991 | Laky |
| 5,088,559 A | 2/1992 | Taliaferro |
| 5,125,061 A | 6/1992 | Marlier et al. |
| 5,125,062 A | 6/1992 | Marlier et al. |
| 5,150,443 A | 9/1992 | Wijnberg |
| 5,329,605 A | 7/1994 | Wargotz |
| 5,339,378 A | 8/1994 | Simonds et al. |
| 5,431,759 A | 7/1995 | Neuroth |
| 5,438,164 A * | 8/1995 | Green .................... H01B 7/292 174/120 R |
| 5,495,547 A | 2/1996 | Rafie et al. |
| 5,778,981 A | 7/1998 | Head |
| 5,787,217 A | 7/1998 | Traut et al. |
| 5,857,523 A | 1/1999 | Edwards |
| 5,894,104 A | 4/1999 | Hedberg |
| 5,930,431 A | 7/1999 | Lail et al. |
| 6,015,013 A | 1/2000 | Edwards et al. |
| 6,030,255 A | 2/2000 | Konishi et al. |
| 6,053,252 A | 4/2000 | Edwards |
| 6,060,662 A | 5/2000 | Rafie et al. |
| 6,116,345 A | 9/2000 | Fontana et al. |
| 6,161,619 A | 12/2000 | Head |
| 6,182,765 B1 | 2/2001 | Kilgore |
| 6,195,487 B1 | 2/2001 | Anderson et al. |
| 6,211,467 B1 | 4/2001 | Berelsman et al. |
| 6,276,456 B1 | 8/2001 | Head |
| 6,386,290 B1 | 5/2002 | Headworth |
| 6,403,889 B1 | 6/2002 | Mehan et al. |
| 6,442,304 B1 | 8/2002 | Crawley et al. |
| 6,484,806 B2 | 11/2002 | Childers et al. |
| 6,488,093 B2 | 12/2002 | Moss |
| 6,555,752 B2 | 4/2003 | Dalrymple et al. |
| 6,559,383 B1 | 5/2003 | Martin |
| 6,559,385 B1 | 5/2003 | Johnson et al. |
| 6,600,108 B1 | 7/2003 | Mydur et al. |
| 6,631,095 B1 | 10/2003 | Bryant et al. |
| 6,659,180 B2 | 12/2003 | Moss |
| 6,675,888 B2 | 1/2004 | Schempf et al. |
| 6,691,775 B2 | 2/2004 | Headworth |
| 6,745,840 B2 | 6/2004 | Headworth |
| 6,747,213 B2 | 6/2004 | Bonicel |
| 6,763,889 B2 | 7/2004 | Rytlewski et al. |
| 6,776,195 B2 | 8/2004 | Blasko et al. |
| 6,807,988 B2 | 10/2004 | Powell et al. |
| 6,834,724 B2 | 12/2004 | Headworth |
| 6,843,321 B2 | 1/2005 | Carlsen |
| 6,919,512 B2 | 7/2005 | Guven et al. |
| 7,000,903 B2 | 2/2006 | Piecyk et al. |
| 7,116,283 B2 | 10/2006 | Benson et al. |
| 7,119,283 B1 | 10/2006 | Varkey et al. |
| 7,139,218 B2 | 11/2006 | Hall et al. |
| 7,170,007 B2 | 1/2007 | Varkey et al. |
| 7,188,406 B2 | 3/2007 | Varkey et al. |

(56) References Cited

U.S. PATENT DOCUMENTS

| | | |
|---|---|---|
| 7,235,743 B2 | 6/2007 | Varkey |
| 7,282,644 B1 | 10/2007 | Alvey |
| 7,288,721 B2 | 10/2007 | Varkey et al. |
| 7,326,854 B2 | 2/2008 | Varkey |
| 7,331,393 B1 | 2/2008 | Hoel |
| 7,402,753 B2 | 7/2008 | Varkey et al. |
| 7,462,781 B2 | 12/2008 | Varkey et al. |
| 7,465,876 B2 | 12/2008 | Varkey |
| 7,586,042 B2 | 9/2009 | Varkey et al. |
| 7,700,880 B2 | 4/2010 | Varkey et al. |
| 7,719,283 B2 | 5/2010 | Ishikawa et al. |
| 7,730,936 B2 | 6/2010 | Hernandez-Solis et al. |
| 7,798,234 B2 | 9/2010 | Ju et al. |
| 7,845,412 B2 | 12/2010 | Sbordone et al. |
| 8,011,435 B2 | 9/2011 | Carossino et al. |
| 8,227,697 B2 | 7/2012 | Varkey et al. |
| 8,387,701 B2 | 3/2013 | Sbordone |
| 8,413,723 B2 | 4/2013 | Varkey et al. |
| 8,807,225 B2 | 8/2014 | Varkey et al. |
| 8,901,425 B2 | 12/2014 | Varkey et al. |
| 8,969,726 B2 * | 3/2015 | Varkey .............. H01B 7/046 174/106 R |
| 9,027,657 B2 | 5/2015 | Varkey |
| 9,368,260 B2 | 6/2016 | Varkey et al. |
| 9,412,492 B2 * | 8/2016 | Varkey .............. H01B 7/046 |
| 2003/0011489 A1 | 1/2003 | Viswanathan |
| 2003/0163179 A1 | 8/2003 | Hoglund et al. |
| 2004/0163822 A1 | 8/2004 | Zhang et al. |
| 2004/0262027 A1 | 12/2004 | Kaczmarski |
| 2005/0217844 A1 | 10/2005 | Edwards et al. |
| 2005/0219063 A1 | 10/2005 | Viswanathan et al. |
| 2006/0151194 A1 | 7/2006 | Varkey et al. |
| 2006/0187084 A1 | 8/2006 | Hernandez-Marti et al. |
| 2006/0211286 A1 | 9/2006 | Shuey |
| 2006/0221768 A1 | 10/2006 | Hall et al. |
| 2006/0242824 A1 | 11/2006 | Varkey et al. |
| 2007/0000682 A1 | 1/2007 | Varkey et al. |
| 2007/0003780 A1 | 1/2007 | Varkey et al. |
| 2007/0044991 A1 | 3/2007 | Varkey |
| 2007/0059499 A1 * | 3/2007 | Yuasa .............. B32B 7/14 428/198 |
| 2007/0158095 A1 | 7/2007 | Sridhar et al. |
| 2008/0083533 A1 | 4/2008 | Malone et al. |
| 2008/0156517 A1 | 7/2008 | Varkey et al. |
| 2008/0190612 A1 | 8/2008 | Buchanan |
| 2009/0038149 A1 | 2/2009 | Varkey |
| 2009/0089998 A1 | 4/2009 | Varkey |
| 2009/0194296 A1 | 8/2009 | Gillan et al. |
| 2009/0194314 A1 | 8/2009 | Varkey et al. |
| 2009/0283295 A1 | 11/2009 | Varkey et al. |
| 2010/0038112 A1 | 2/2010 | Grether |
| 2010/0255186 A1 * | 10/2010 | Montes .............. H01B 7/295 427/117 |
| 2010/0263904 A1 | 10/2010 | Varkey et al. |
| 2012/0222869 A1 | 9/2012 | Varkey |
| 2014/0352952 A1 | 12/2014 | Varkey et al. |
| 2016/0329128 A1 | 11/2016 | Varkey et al. |
| 2017/0268304 A1 | 9/2017 | Varkey |

FOREIGN PATENT DOCUMENTS

| | | |
|---|---|---|
| CN | 201413731 Y | 2/2010 |
| EP | 0003104 B1 | 7/1979 |
| EP | 471600 A1 | 2/1992 |
| EP | 1216342 B1 | 6/2002 |
| EP | 2039878 A1 | 3/2009 |
| FR | 2767861 A1 | 3/1999 |
| GB | 2234772 A | 2/1991 |
| JP | 54007186 A | 1/1979 |
| JP | 2216710 A | 8/1990 |
| JP | 2002243999 A | 8/2002 |
| JP | 2003151375 A | 5/2003 |
| WO | 9948111 A1 | 9/1999 |
| WO | 0125593 A1 | 4/2001 |
| WO | 02071178 A2 | 9/2002 |
| WO | 2006003362 A1 | 1/2006 |
| WO | 2006027553 A1 | 3/2006 |
| WO | 2006088372 A1 | 8/2006 |
| WO | 2007034242 A1 | 3/2007 |
| WO | 2011037974 A2 | 3/2011 |

OTHER PUBLICATIONS

Lebedev, et al., "The breakdown Strength of two-layer dlielectrics", High Voltage Engineering, 1999. Eleventh International Symposium, Conf. PubL No. 467, vol. 4, Aug. 22-27, 1999, pp. 304-307.
Salama, et al., "Instructional design of multi-layer insulation of power cabels". Power Systems, IEEE Transations, vol. 7, Issue 1, Feb. 1992, pp. 377-382.
International Search Report and Written Opinion issued in the related PCT application PCT/US2010/049783, dated May 9, 2011 (7 pages).
International Preliminary Report on Patentability issued in the related PCT application PCT/US2010/049783, dated Mar. 22, 2012 (5 pages).
Examination Report issued in the related AU application 2010298356, dated Oct. 19, 2015, (3 pages).
Office Action issued in the related MX application MX/a/2012/003397, dated Jun. 30, 2015 (5 pages).
International Search Report and Written Opinion issued in the related PCT application PCT/US2010/031218, dated Nov. 17, 2010 (6 pages).
International Preliminary Report on Patentability issued in the related PCT application PCT/US2010/031218, dated Oct. 18, 2011 (4 pages).
Examination Report issued in the related AU application 2010236397, dated Apr. 22, 2015, (15 pages).
Extended Search Report issued in the related EP Application 10765176.2, dated Mar. 23, 2015 (7 pages).
Office action issued in the related EP Application 10765176.2, dated Nov. 24, 2017 (6 pages).
Extended European Search Report issued in the related EP Application 117933206.1, dated Nov. 28, 2014 (11 pages).
International Search Report and Written Opinion issued in the related PCT application PCT/US2011/039879, dated Jan. 16, 2012 (9 pages).
International Preliminary Report on Patentability issued in the related PCT application PCT/US2011/039879, dated Dec. 20, 2012 (8 pages).
Office Action issued in the related MX application MX/a/2012/013746, dated Aug. 23, 2013, (4 pages).
EP Communication Article 94-3 issued in the related EP Application 117933206.1, dated Dec. 6, 2016 (8 pages).
Examination Report issued in the related CA application 2799642, dated Mar. 13, 2017 (4 pages).
Examination Report issued in the related AU Application 2011236038, dated Jul. 28, 2015 (3 pages).
Office Action issued in the related MX application MX/a/2011/010863, dated Jan. 29, 2014, (8 pages).
Examination Report issued in the related CA application 2755231, dated Aug. 1, 2017 (5 pages).
Office Action issued in the related Brazil Patent Application No. PI1011343.6 dated Oct. 30, 2019, 6 pages with English translation.
First Examination report issued in Saudi Arabia patent application 120420323 dated Feb. 2, 2022. (6 pages with translation).
Office Action received in NO application 20073677, dated Oct. 15, 2015 (6 pages with translation).
Examination Report issued in AU Application 2006205539, dated May 24, 2010 (2 pages).
Examination Report issued in CA Application 2594393, dated Apr. 12, 2011 (4 pages).
Office Action issued in the EP Application 06701794.7, dated Dec. 13, 2007 (2 pages).

(56) References Cited

OTHER PUBLICATIONS

Examination Report issued in IN Application 3079/CHENP/2007, dated May 24, 2012 (1 page).

* cited by examiner

FIG. 1
Prior Art
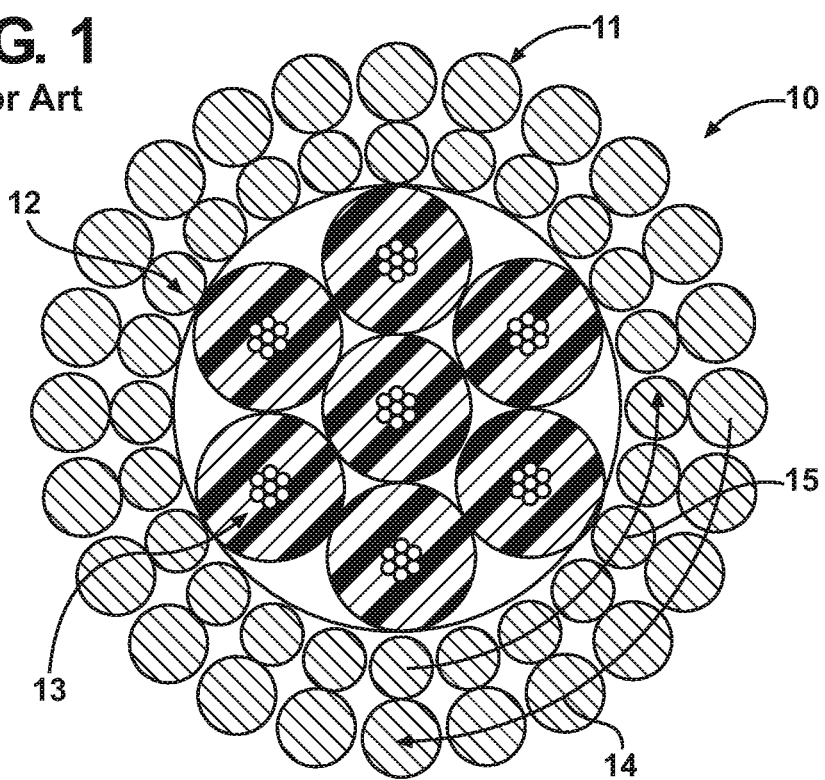
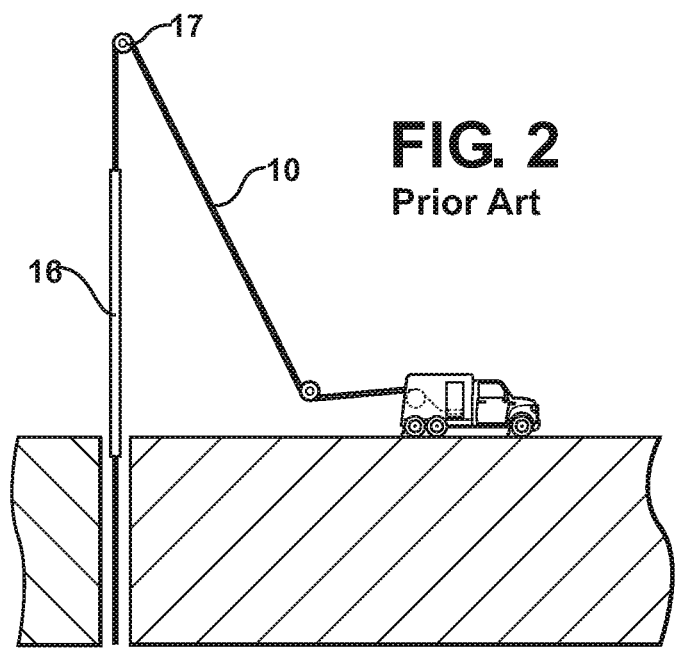
FIG. 2
Prior Art
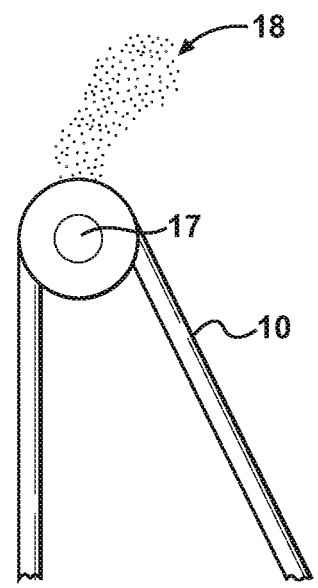
FIG. 3
Prior Art

TORQUE-BALANCED, GAS-SEALED WIRELINE CABLES

CROSS-REFERENCE TO RELATED APPLICATIONS

This Application is a continuation-in-part application of U.S. patent application Ser. No. 15/214,703, entitled: "Torque-Balanced, Gas-Sealed Wireline Cables", filed on Jul. 20, 2016, which is a continuation application of then U.S. patent application Ser. No. 12/425,439, entitled: "Torque-Balanced, Gas-Sealed Wireline Cables", filed on Apr. 17, 2009, and granted as U.S. Pat. No. 9,412,492, this Application is also a continuation-in-part application of U.S. patent application Ser. No. 15/617,270, filed Jun. 9, 2017, entitled "Wireline Cable For Use With Downhole Tractor Assemblies" which is a continuation of then U.S. patent application Ser. No. 14/705,094, filed May 6, 2015, now U.S. Pat. No. 9,677,359, which is a continuation of U.S. patent application Ser. No. 13/497,142, filed May 9, 2012 now granted as U.S. Pat. No. 9,027,657, which is a 371 of International Application No. PCT/US2010/049783, filed Sep. 22, 2010, which claims benefit of U.S. Provisional Patent Application Ser. No. 61/277,219, filed Sep. 22, 2009, furthermore this application is a continuation-in-part of co-pending U.S. patent application Ser. No. 15/180,789, entitled: "Cable or Cable Portion with a Stop Layer", which as a continuation application of then U.S. patent application Ser. No. 13/702,919, entitled: "Cable Or Cable Portion With A Stop Layer" now U.S. Pat. No. 9,368,260, which is a 371 of International Application No. PCT/US2011/039879, filed Jun. 9, 2011, which claims benefit of U.S. Provisional Patent Application Ser. No. 61/397,255, filed Jun. 9, 2010; the entirety of all of above are incorporated herein by reference.

FIELD

Embodiments of the present disclosure generally relate to downhole cables.

BACKGROUND

The statements in this section merely provide background information related to the present disclosure and may not constitute prior art.

The present disclosure relates generally to oilfield cables and, in particular, to wireline cables, and methods of making and using such cables.

Several common problems encountered with wireline cables used in oilfield operations are related to armor wire strength members. Armor wire is typically constructed of cold-drawn plow ferritic steel coated with a zinc coating for corrosion protection. These armor wires provide the strength needed to raise and lower the weight of the cable and tool string and protect the cable core from impact and abrasion damage. Typical wireline cable designs consist of a cable core of one or more insulated conductors (packed in an interstitial filler in the case of multiple conductors) wrapped in cabling tape followed by the application of two armor wire layers. The armor wire layers are applied counterhelically to one another in an effort to minimize torque imbalance between the layers. In an effort to provide additional protection against impact, cut through, and abrasion damage, larger-diameter armor wires are typically placed in the outer layer. Due to shortcomings in these designs, torque imbalance between the armor wire layers continues to be an issue, resulting in cable stretch, cable core deformation and significant reductions in cable strength.

In pressurized wells, gas can infiltrate through gaps between the armor wires and travel along spaces existing between the inner armor wire layer and the cable core. Grease-filled pipes at the well surface provide a seal at the well surface. As the wireline cable passes through these pipes, pressurized gas can travel through the spaces among armor wires and the cable core. When the cable then passes over and bends over a sheave, the gas is released, resulting in an explosion and fire hazard.

In typical wireline cable designs, such as a wireline cable 10 shown in FIG. 1, outer armor wires 11 were sized larger than inner armor wires 12 in an effort to provide greater protection against impact, cut-through, and abrasion damage. One unintended effect of this design strategy is to increase torque imbalance. In those designs, the outer armor wires 11 carry roughly 60% of the load placed on the cable. This causes the outer armor wires 11 to straighten slightly when the cable is under tension, which in turn causes the cable core 13 to stretch and the inner armor wires 12 to be wound more tightly around the cable core. The outer armor wires 11 and inner armor wires 12 may come into point-to-point contact which wears away the protective zinc layer leading to premature corrosion. The cable core 13 can also be damaged as it deforms into the interstitial spaces between the inner armor wires 12. Additionally, because the outer armor wires 11 are carrying the bulk of the load, they are more susceptible to breaking if damaged, thereby largely negating any benefits of placing the larger armor wires in the outer layer.

Under tension, the inner and outer armor wires (which are applied at opposite lay angles) tend to rotate in opposite directions as shown by arrows 14 and 15 respectively as shown in FIG. 1. Because the larger outer armor wires 11 are dominant, the outer armor wires tend to open, while the inner armor wires 12 tighten, causing torque imbalance problems. To create a torque-balanced cable, the inner armor wires would have to be somewhat larger than the outer armor wires. This configuration has been avoided in standard wireline cables in the belief that the smaller outer wires would quickly fail due to abrasion and exposure to corrosive fluids. Therefore, larger armor wires have been placed at the outside of the wireline cable, which increases the likelihood and severity of torque imbalance.

Torque for a layer of armor wire can be described in the following equation.

$$\text{Torque} = \frac{1}{4} T \times PD \times \sin 2\alpha$$

Where: T=Tension along the direction of the cable; PD=Pitch diameter of the armor wires; and $\alpha$=Lay angle of the wires.

Pitch diameter (the diameter at which the armor wires are applied around the cable core or the previous armor wire layer) has a direct effect on the amount of torque carried by that armor wire layer. When layers of armor wire constrict due to cable stretch, the diameter of each layer is reduced numerically the same. Because this reduction in diameter is a greater percentage for the inner layer of armor wires 12, this has a net effect of shifting a greater amount of the torque to the outer layer of armor wires 11.

In high-pressure wells, the wireline 10 is run through one or several lengths of piping 16 packed with grease to seal the gas pressure in the well while allowing the wireline to travel in and out of the well (see FIG. 2). Armor wire layers have unfilled annular gaps between the armor wire layers and the cable core. Under well conditions, well debris and the grease used in the risers can form a seal over the armor wires, allowing pressurized gas to travel along the cable core beneath the armor wires. Pressurized gas from the well can infiltrate through spaces between the armor wires and travel upward along the gaps between the armor wires and the cable core upward toward lower pressure. Given cable tension and the sealing effects of grease from the risers and downhole debris coating the armor wire layers, this gas tends to be held in place as the wireline travels through the grease-packed risers. As the wireline 10 bends when passing over the upper sheave 17 (located above the risers), the armor wires tend to spread apart slightly and the pressurized gas 18 is released. This released gas 18 becomes an explosion hazard (see FIG. 3).

It is desirable, therefore, to provide a cable that overcomes the problems encountered with wireline cable designs.

The disclosed designs minimize the problems described above by:

Placing layers of soft polymer between the inner armor wires and the cable core and between the inner and outer armor wire layers; and Using larger-diameter armor wires for the inner layer than for the outer layer.

The polymeric layers provide several benefits, including:

Eliminating the space along the cable core and the first layer of armor along which pressurized gas might travel to escape the well;

Eliminating the space into which the cable core might creep and deform against the inner armor wires;

Cushioning contact points between the inner and outer armor wires to minimize damage from armor wires rubbing against each other;

Filling space into which the inner armor wire might otherwise be compressed, thereby minimizing cable stretch; and Filling space into which the inner armor wire might otherwise be compressed, thereby minimizing the above-described effect of shifting torque to the outer armor wire layer when the diameters of both the inner and outer armor wire layers are decreased by the same amount.

Torque balance is achieved between the inner and outer armor wire layers by placing larger wires in the inner layer. As explained below, this allows the majority of the load to be carried by the inner armor wires. While in traditional armor wire configurations, the outer wires ended up carrying approximately 60 percent of the load and the inner wires approximately 40 percent. By placing the larger armor wires in the inner layer, the proportions of load can be more or less reversed, depending on individual cable design specifications.

The designs place soft thermoplastic polymer layers over the cable core and between the inner and outer armor wire layers and reconfigure the sizes of armor wires used such that larger armor wires are placed in the inner layer. As an option, these designs may utilize solid armor wires in the inner layer and stranded armor wires in the outer layer. These design changes result in a more truly torque-balanced cable that is sealed against intrusion and travel of pressurized gas. These designs may also have an outer layer of polymer to create a better seal at the well surface.

SUMMARY

A smooth torque balanced cable. The smooth torque balanced cable includes an electrically conductive cable core for transmitting electrical power. A first polymer surrounds the cable core. An inner layer of a plurality of first armor wires surrounds the cable core, and the first armor wires are at least in partial contact with the first polymer and at least partial contact with a second polymer disposed opposite the first polymer. An outer layer of a plurality of second armor wires surrounds the inner layer. The second armor wires have a stranded configuration. Interstitial spaces between the second armor wires are at least partially filled with a third polymer, and the outer layer of a plurality of second armor wires is at least partially covered by the third polymer. The third polymer is ethylene-tetrafluoroethylene. The coverage of the outer layer of armor wires over the inner layer of armor wires is less than or approximately equal to 88 percent. The second polymer separates the plurality of first armor wires from the plurality of second armor wires.

A method of conveying torque balanced cable into a wellbore includes connecting a cable to downhole equipment. The cable includes an electrical conductive core and at least a smooth outer jacket. The method also includes passing the cable and downhole equipment through pressure control equipment, wherein a seal is formed between the smooth outer jacket and a rubber pack-off, and the running of the cable into the wellbore is done without the use of grease in the pressure control equipment, and wherein the torque in the cable is balanced.

A method of forming a cable, the method includes providing an electrically conductive cable core for transmitting electrical power. The method also includes surrounding the cable core with a first polymer material and providing a plurality of first armor wires and winding the first armor wires around the first polymer to form an inner layer of armor wires imbedded in the first polymer. The method also includes providing a second polymer about the inner layer of first armor wires. The method can also include providing a plurality of second armor wires and winding the second armor wires around the inner layer to form an outer layer of armor wires. The coverage of the outer layer of armor wires over the inner layer of armor wires is less than or approximately equal to 88 percent, and wherein the second polymer separates the plurality of first armor wires from the plurality of second armor wires.

BRIEF DESCRIPTION OF THE DRAWINGS

These and other features and advantages of the present invention will be better understood by reference to the following detailed description when considered in conjunction with the accompanying drawings wherein:

FIG. 1 is a radial cross-sectional view of a prior art wireline cable;

FIG. 2 is a schematic cross-sectional view of the prior art wireline cable shown in FIG. 1 in use;

FIG. 3 is an enlarged view of the prior art wireline cable and the upper sheave shown in FIG. 2;

DETAILED DESCRIPTION

Figure 4A:
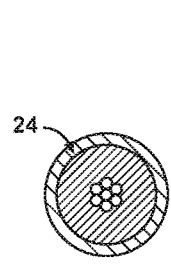
FIGS. 4A through 4D are radial cross-sectional views of a first embodiment wireline mono cable.
Figure 4B:
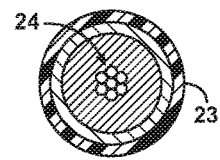

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The present invention relates to a wireline cable that utilizes soft polymers as interstitial fillers beneath and between the armor wire layers, which soft polymers may be any suitable material, including but not limited to the following: polyolefin or olefin-base elastomer (such as Engage®, Infuse®, etc.); thermoplastic vulcanizates (TPVs) such as Santoprene® and Super TPVs and fluoro TPV (F-TPV); silicone rubber; acrylate rubber; soft engineering plastics (such as soft modified polypropylene sulfide (PPS] or modified Poly-ether-ether-ketone [PEEK]); soft fluoropolymer (such as high-melt flow ETFE (ethylene-tetrafluoroethylene) fluoropolymer; fluoroelastomer (such as DAI-EL™ manufactured by Daikin); and thermoplastic fluoropolymers.

The above polymers can be also used with various additives to meet the mechanical requirement.

Armor wire strength members may be any suitable material typically used for armor wires, such as: galvanized improved plow steel (with a variety of strength ratings); high-carbon steel; and 27-7 Molybdenum. These may be used as solid armors or stranded members.

Low-temperature polymers may be used for the polymeric jacketing layers to enable the armoring process to be stopped without damaging the cable core. This strategy, as discussed below, requires that the "low-temperature" polymers have process temperatures 25° F. to 50° F. below those used in the cable core. Possible jacketing materials include: polyolefin-base and acrylate-base polymers with process temperatures in ranging from 300° F. to 450° F.; and fluoropolymer with lower melting point.

The core polymers are chosen to have higher melting point than the processing temperature of the polymers selected to fill the space between the core and inner wire, and also the space between inner armor and outer armor wires. This allows combining the armoring and extrusion process at the same time to stop the armoring process for troubleshooting when needed with no concerns of getting melted and thermally degraded core polymers in the extrusion crosshead.

The key to achieving torque balance between the inner and outer armor wire layers is to size the inner armor wires appropriately to carry their share of the load. Given the likelihood that some minimal amount of stretch may occur, these designs begin with the inner armor wires carrying slightly approximately 60 percent of the load. Any minimal stretch that may occur (which tends to shift load to the outer armor wires) will therefore only tend to slightly improve torque balance between the armor wire layers.

In a torque-balanced cable: $Torque_i = Torque_o$

Where: $Torque_i$=Torque of the inner armor wires; and $Torque_j$=Torque of the outer armor wires.

Torque for a layer of armor wires in a wireline cable can be measured by applying the following equation:

$$Torque = \tfrac{1}{4} T \times PD \times \sin 2\alpha$$

Where: T=Tension along the direction of the cable; PD=Pitch diameter of the armor wires; and α=Lay angle of the wires.

The primary variable to be adjusted in balancing torque values for armor wires applied at different circumferences is the diameter of the wires. The lay angles of the inner and outer armor wires are typically roughly the same, but may be adjusted slightly to optimize torque values for different diameter wires. Because the inner layer of wires has a smaller circumference, the most effective strategy for achieving torque balance is for their individual diameters to be larger than those in the outer layer. Several sample embodiments of torque-balanced, gas-blocking wireline cable designs are described below that apply these principles. In no way do these examples describe all of the possible configurations that can be achieved by applying these basic principles.

A first embodiment is a 0.26±0.02 inch diameter mono/coaxial/triad or other configuration wireline cable with torque balance and gas-blocking design (FIGS. 4A through 4D)—

Figure 4C:
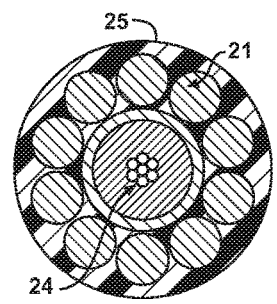
Figure 4D:
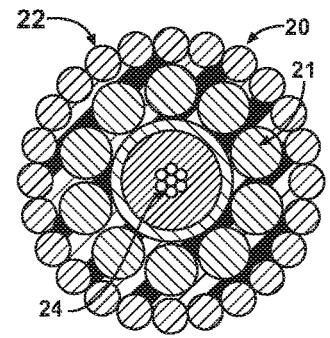
Figure 5A:
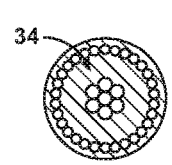
FIGS. 5A through 5D are radial cross-sectional views of a second embodiment wireline coaxial cable.
Figure 5B:
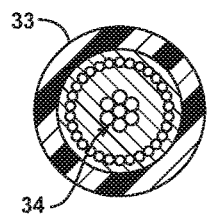
Figure 5C:
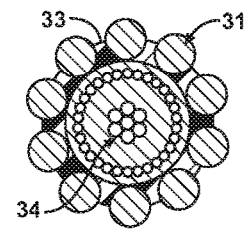
Figure 5D:
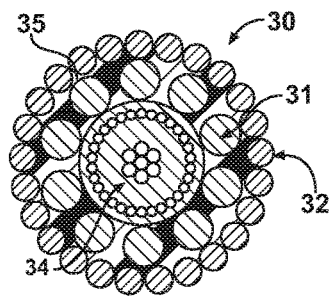
Figures 6A, 6B, 6C, 6D:
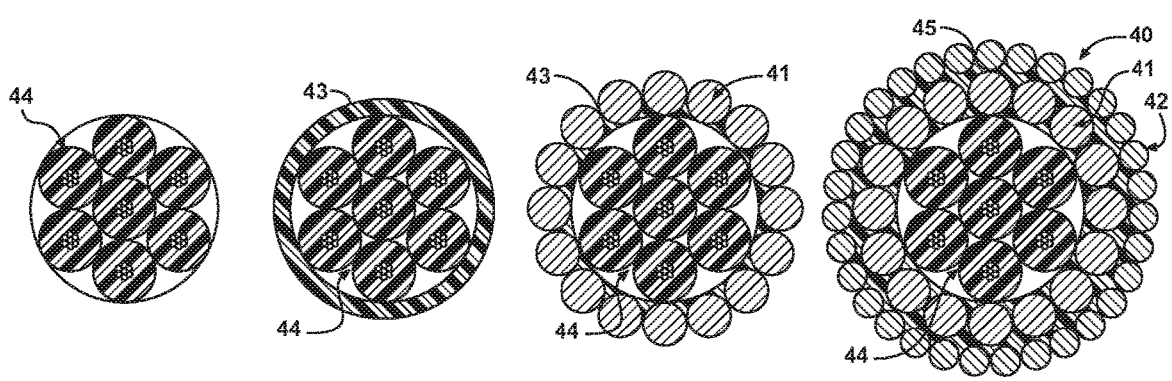
FIGS. 6A through 6D are radial cross-sectional views of a third embodiment wireline hepta cable.

For a mono/coaxial/triad or any other configuration wireline cable 20 with a core diameter of 0.10-0.15 inch and a completed diameter of 0.26±0.02 inch, torque balance could be achieved with inner armor wires 21 of 0.035-0.055 inch diameter and outer armor wires 22 with diameters of 0.020-0.035 inch. The gas blocking is achieved by placing a layer 23 of soft polymer (FIG. 4B) over the cable core 24 (FIG. 4A) before the inner armor wires 21 are cabled over the core (FIG. 4C). The inner armor wires 21 imbed partially into the soft polymer layer 23 such that no gaps are left between the inner armor wires and the cable core. A second layer 25 of soft polymer (FIG. 4C) is optionally extruded over the inner armor wires 21 before the outer armor wires 22 are applied to the cable (FIG. 4D). The second layer 25 of soft polymer fills any spaces between the inner and outer armor wires layers and prevents pressurized gas from infiltrating between the armor wires. By eliminating space for the inner armor wires to compress into the cable core 24, the cable 20 also significantly minimizes cable stretching which helps to further protect the cable against developing torque imbalance in the field. For the values given for this cable, the inner armor wire layer 21 will carry approximately 60% of the load.

A second embodiment is a 0.32±0.02 inch diameter mono/coaxial/hepta or other configuration wireline cable with torque balance and gas-blocking design (FIGS. 5A through 5D)—

For a mono/coaxial/hepta or any other configuration wireline cable 30 with a core diameter of 0.12-0.2 inch and a completed diameter of 0.32±0.02 inch, torque balance could be achieved with inner armor wires 31 of 0.04-0.06 inch diameter and outer wires 32 with diameters of 0.02-0.04 inch. The gas blocking is achieved by placing a layer 33 of soft polymer (FIG. 5B) over the cable core 34 (FIG. 5A) before the inner armor wires are cabled over the core. The inner armor wires 31 imbed partially into the soft polymer layer 33 (FIG. 5C) such that no gaps are left between the inner armor wires and the cable core 34. A second layer 35 of soft polymer (FIG. 5D) is optionally extruded over the inner armor wires 31 before the outer armor wires 32 are applied to the cable 30. The second layer 35 of soft polymer fills any spaces between the inner and outer armor wires layers and prevents pressurized gas from infiltrating between the armor wires. By eliminating space for the inner armor wires to compress into the cable core 34, the cable 30 also significantly minimizes cable stretching which helps to further protect the cable against developing torque imbalance in the field. For the values given for this cable, the inner armor wire layer 31 will carry approximately 60% of the load.

A third embodiment is a 0.38±0.02 inch diameter hepta/triad/quad or any other configuration wireline cable with torque balance and gas blocking (FIGS. 6A through 6D)—

For a hepta/triad/quad or any other wireline cable 40 configuration with a core diameter of 0.24-0.29 inch and a completed diameter of 0.38±0.02 inch, torque balance could be achieved with inner armor wires 41 of 0.04-0.06 inch diameter and outer wires 42 with diameters of 0.025-0.045 inch. The gas blocking is achieved by placing a layer 43 of soft polymer (FIG. 6B) over the cable core 44 (FIG. 6A) before the inner armor wires 41 are cabled over the core. The inner armor wires 41 imbed partially into the soft polymer (FIG. 6C) such that no gaps are left between the inner armor wires and the cable core 44. A second layer 45 of soft polymer (FIG. 6D) is optionally extruded over the inner armor wires 41 before the outer armor wires 42 are applied to the cable 40. The second layer 45 of soft polymer fills any spaces between the inner and outer armor wires layers and prevents pressurized gas from infiltrating between the armor wires. By eliminating space for the inner armor wires 41 to compress into the cable core 44, the cable 40 also significantly minimizes cable stretching which helps to further protect the cable against developing torque imbalance in the field. For the values given for this cable, the inner armor wire layer will carry approximately 60% of the load.

A fourth embodiment is a 0.42±0.02 inch diameter hepta/triad/quad or any other configuration wireline cable with torque balance and gas blocking (FIGS. 7A through 7D)—

Figures 7A, 7B, 7C, 7D:
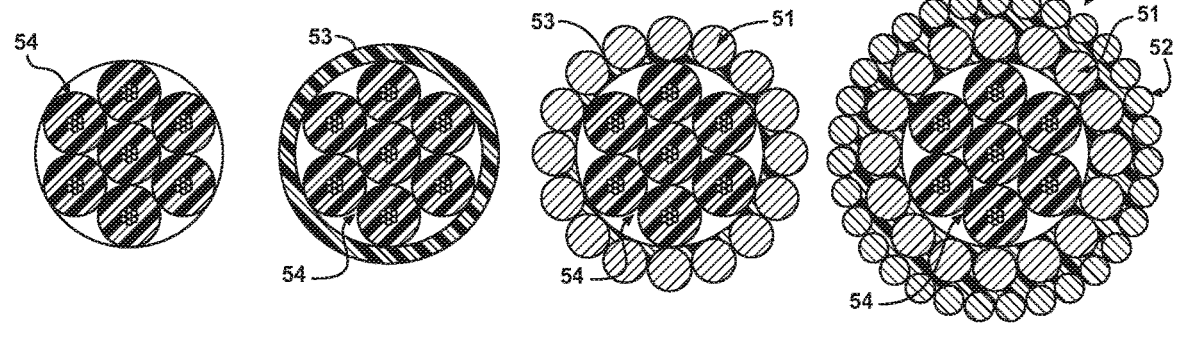
FIGS. 7A through 7D are radial cross-sectional views of a fourth embodiment wireline hepta cable.

For a hepta/triad/quad or any other wireline cable 50 configuration with a core diameter of 0.25-0.30 inch and a completed diameter of 0.42±0.02 inch, torque balance could be achieved with inner armor wires 51 of 0.04-0.06 inch diameter and outer armor wires 52 with diameters of 0.025-0.045 inch. The gas blocking is achieved by placing a layer 53 of soft polymer (FIG. 7B) over the cable core 54 (FIG. 7A) before the inner armor wires 51 are cabled over the core (FIG. 7C). The inner armor wires 51 imbed partially into the soft polymer layer 53 such that no gaps are left between the inner armor wires and the cable core 54. A second layer 55 of soft polymer (FIG. 7D) is optionally extruded over the inner armor wires 51 before the outer armor wires 52 are applied to the cable 50. The second layer 55 of soft polymer fills any spaces between the inner and outer armor wires layers and prevents pressurized gas from infiltrating between the armor wires. By eliminating space for the inner armor wires 51 to compress into the cable core 54, the cable 50 also significantly minimizes cable stretching which helps to further protect the cable against developing torque imbalance in the field. For the values given for this cable, the inner armor wire layer will carry approximately 60% of the load.

A fifth embodiment is a 0.48±0.02 inch diameter hepta/triad/quad or any other configuration wireline cable with torque balance and gas blocking (FIGS. 8A through 8D)—

Figures 8A, 8B, 8C, 8D:
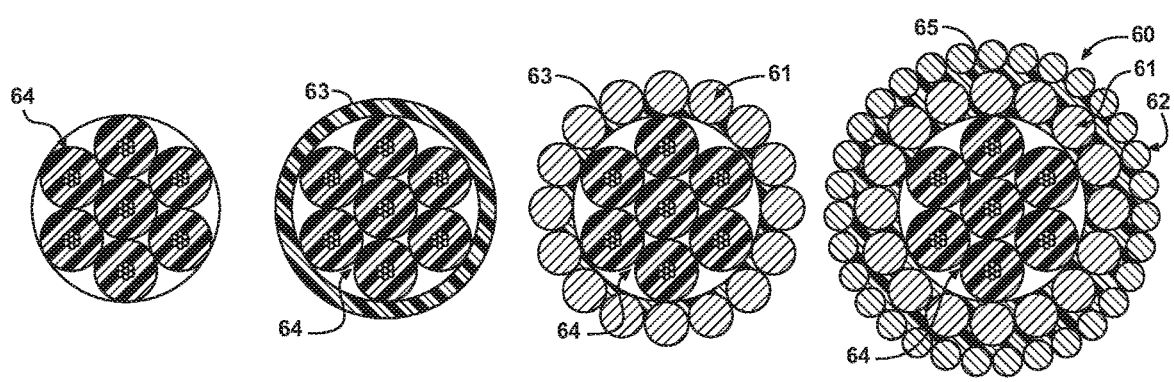
FIGS. 8A through 8D are radial cross-sectional views of a fifth embodiment wireline hepta cable.

For a hepta/triad/quad or any other wireline cable 60 configuration with a core diameter of 0.20-0.35 inch and a completed diameter of 0.48±0.02 inch, torque balance could be achieved with inner armor wires 61 of 0.05-0.07 inch diameter and outer armor wires 62 with diameters of 0.03-0.05 inch. The gas blocking is achieved by placing a layer 63 of soft polymer (FIG. 8B) over the cable core 64 (FIG. 8A) before the inner armor wires 61 are cabled over the core (FIG. 8C). The inner armor wires 61 imbed partially into the soft polymer layer 63 such that no gaps are left between the inner armor wires and the cable core 64. A second layer 65 of soft polymer (FIG. 8D) is optionally extruded over the inner armor wires 61 before the outer armor wires 62 are applied to the cable 60. The second layer 65 of soft polymer fills any spaces between the inner and outer armor wires layers and prevents pressurized gas from infiltrating between the armor wires. By eliminating space for the inner armor wires 61 to compress into the cable core 64, the cable 60 also significantly minimizes cable stretching which helps to further protect the cable against developing torque imbalance in the field. For the values given for this cable, the inner armor wire layer will carry approximately 60% of the load.

A sixth embodiment is a 0.52±0.02 inch diameter hepta cable with torque-balanced, gas-blocking design (FIGS. 9A through 9D)—

Figures 9A, 9B, 9C, 9D:
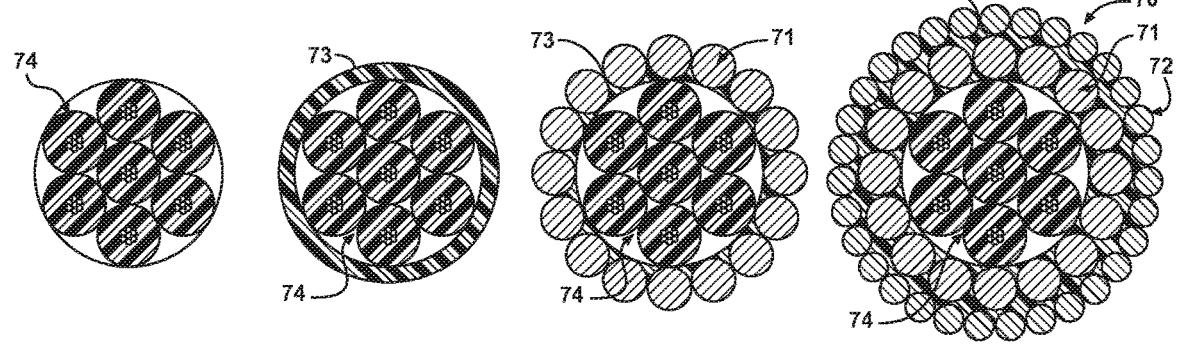
FIGS. 9A through 9D are radial cross-sectional views of a sixth embodiment wireline hepta cable.

For a hepta cable 70 with a core diameter of 0.25-0.40 inch and a completed diameter of 0.52±0.02 inch, torque balance could be achieved with inner armor wires 71 of 0.05-0.07 inch diameter and outer armor wires 72 with diameters of 0.03-0.05 inch. The gas blocking is achieved by placing a layer 73 of soft polymer (FIG. 9B) over the cable core 74 (FIG. 9A) before the inner armor wires 71 are cabled over the core (FIG. 9C). The inner armor wires 71 imbed partially into the soft polymer layer 73 such that no gaps are left between the inner armor wires and the cable core 74. A second layer 75 of soft polymer (FIG. 9D) is optionally extruded over the inner armor wires 71 before the outer armor wires 72 are applied to the cable 70. The second layer 75 of soft polymer fills any spaces between the inner and outer armor wires layers and prevents pressurized gas from infiltrating between the armor wires. By eliminating space for the inner armor wires 71 to compress into the cable core 74, the cable 70 also significantly minimizes cable stretching which helps to further protect the cable against developing torque imbalance in the field. For the values given for this cable, the inner armor wire layer will carry approximately 60% of the load.

A seventh embodiment includes an optional stranded wire outer armoring (FIG. 10)—

Figure 10:
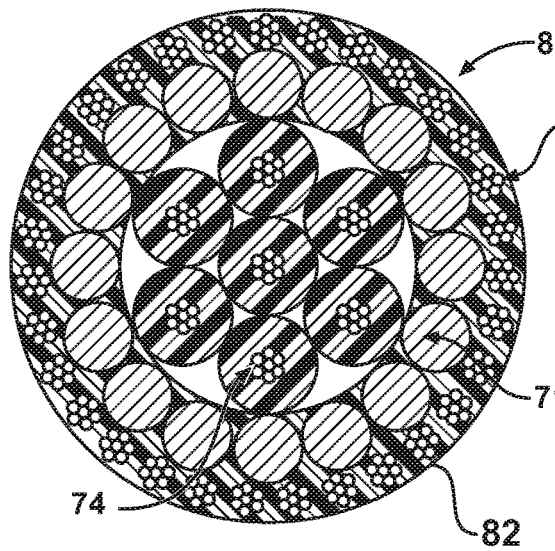
FIG. 10 is a radial cross-sectional view of a seventh embodiment wireline cable.

As an option in any of the embodiments described above, the outer layer of solid armor wires may be replaced with similarly sized stranded wires 81 in a wireline cable 80 as shown in FIG. 10. If a stranded wire is used on the outside, a jacket 82 is put over the top of the stranded wires 81 and bonded to the inner jacket between the stranded wires in order not to expose the small individual elements directly to well bore conditions of abrasion and cutting.

An eighth embodiment includes an outer, easily sealed polymeric jacket (FIG. 11)—

Figure 11:
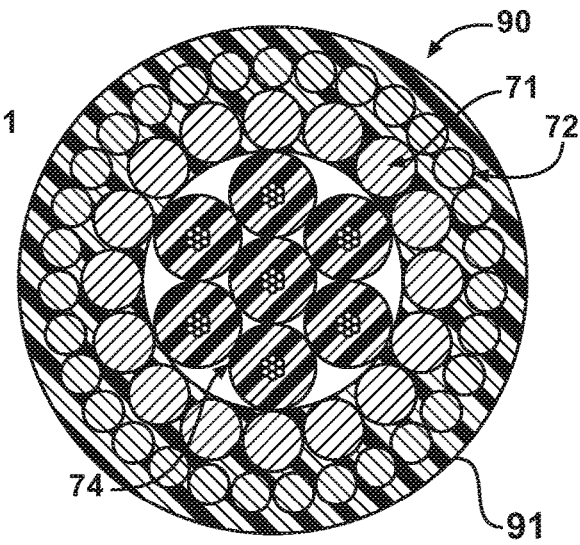
FIG. 11 is a radial cross-sectional view of an eighth embodiment wireline cable.

To create torque-balanced, gas-sealed cables that are also more easily sealed by means of a rubber pack-off instead of pumping grease through flow tubes at the well surface, any of the above embodiments may be provided with an outer polymeric jacket 91. To continue the gas-sealed capabilities to the outer diameter of the cable 90, this polymeric material can be bondable to the other jacket layers. For example (as shown in FIG. 11), an outer jacket 91 of carbon-fiber-reinforced ETFE (ethylene-tetrafluoroethylene) fluoropolymer may be applied over the outer armor wire layer 72, bonding through the gaps in the outer strength members. This creates a totally bonded jacketing system and with the addition of the fiber-reinforced polymer, also provides a more durable outer surface. For this, the polymer that is placed between the inner and outer armor layers needs to bond to the jacket placed on top of the outer armor wires 72 through the gap in the outer armor wires.

Figure 12:
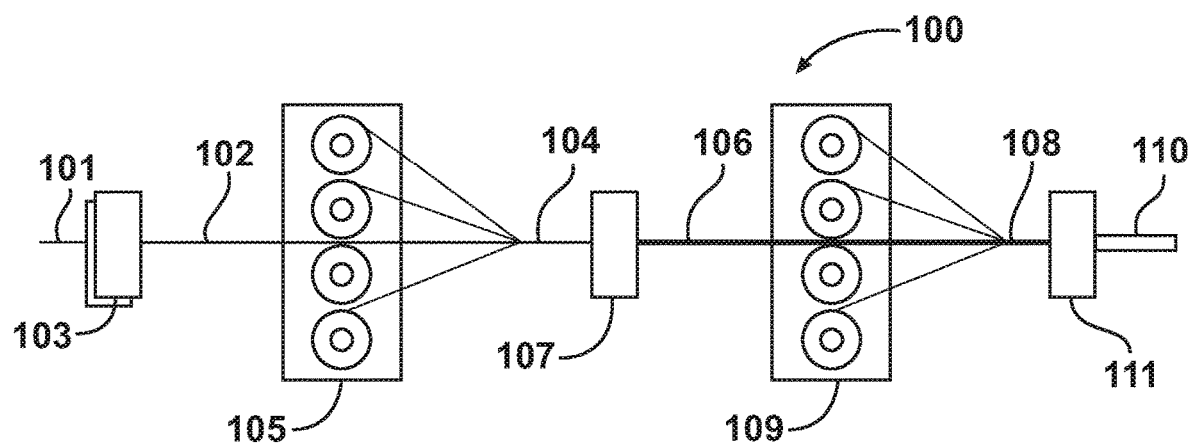
FIG. 12 is a schematic representation of a manufacturing line for constructing wireline cable.

In any of the above-described embodiments, polymers for the armor-jacketing layers may be chosen with significantly lower process temperatures (25° F. to 50° F. lower) than the melting point of polymers used in the cable core. This enables the armoring process to be stopped and started during armoring without the risk that prolonged exposure to extruding temperatures will damage the cable core. This on-line process is as follows with reference to a schematic representation of a wireline cable manufacturing line 100 shown in FIG. 12:

A cable core 101 enters the armoring process line 100 at the left in FIG. 12.

A layer of soft polymer 102 is extruded over the cable core 101 in a first extrusion station 103. The soft outer polymer allows for better and more consistent embedding of the armor wires into the polymer. In case that the cable core 101 needs to be protected during the armoring process or harsh field operation, dual layers of hard and soft polymers can be co-extruded over the cable core. A hard polymer layer placed underneath a soft polymer layer is mechanically resistant so that such a layer could prevent armor wires from breaking into the cable core through the soft layer. Alternatively this layer could be extruded prior to the armoring process.

An inner armor wire layer 104 is cabled helically over and embedded into the soft polymer 102 at a first armoring station 105. While armoring, any electromagnetic heat source such as infrared waves, ultrasonic waves, and microwaves may be used to further soften the polymers to allow the armoring line 100 to be run faster. This could be applied before the armor hits the core or after the armor touches the core.

A second layer 106 of soft polymer is extruded over the embedded inner layer 104 of armor wires at a second extrusion station 107.

An outer armor wire layer 108 is cabled (counterhelically to the inner armor wire layer 104) over and embedded into the soft polymer 106 at a second armoring station 109. While armoring, any electromagnetic heat source such as infrared waves, ultrasonic waves, and microwaves maybe used to further soften polymers to allow the armoring line 100 to be run faster. This could be applied before the armor hits the core or after the armor touches the core.

If needed, a final layer 110 of hard polymer is extruded over the embedded outer armor wire layer 108 at a third extrusion station 111 to complete the cable as described above.

Although the on-line combined process as described is preferred to save a significant amount of manufacturing time, each step of the process can be separated for accommodation of process convenience.

Figure 13:
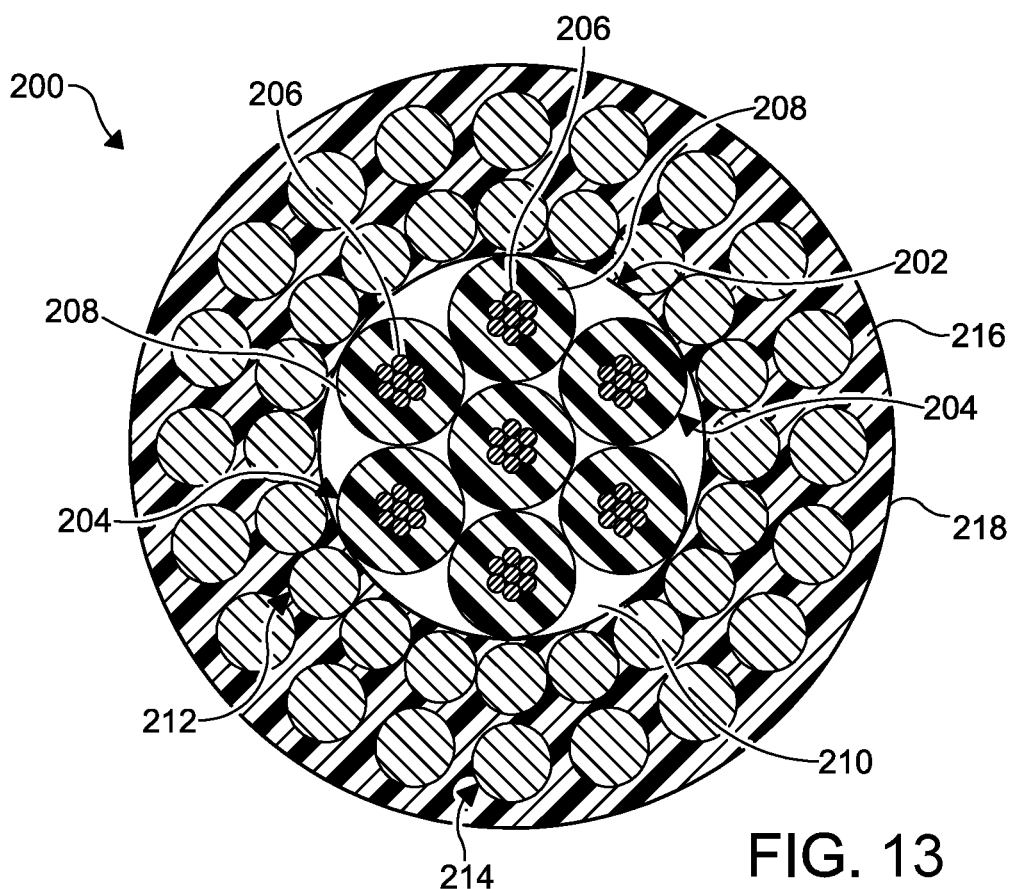
FIGS. 13-25 are a radial cross-sectional views, respectively, of embodiments of a wireline cable.

Referring to FIG. 13, there is illustrated a torque balanced cable 200 for downhole operations according to a first embodiment of the present invention. As shown, the cable 200 includes a core 202 having a plurality of conductors 204. As a non-limiting example, each of the conductors 204 is formed from a plurality of conductive strands 206 disposed adjacent each other with an insulator 208 disposed therearound. As a further non-limiting example, the core 202 includes seven distinctly insulated conductors 204 disposed in a hepta cable configuration. However, any number of conductors 204 can be used in any configuration, as desired. In certain embodiments an interstitial void 210 formed between adjacent insulators 208 is filled with a semi-conductive (or non-conductive) filler (e.g. filler strands, polymer insulator filler).

The core 202 is surrounded by an inner layer of armor wires 212 (e.g. high modulus steel strength members) which is surrounded by an outer layer of armor wires 214. The armor wires 212 and 214 may be alloy armor wires. As a non-limiting example the layers 212, 214 are contra helically wound with each other. As shown, a coverage of the circumference of the outer layer 214 over the inner layer 212 is reduced from the 98% coverage found in conventional wireline cables to a percentage coverage that matches a torque created by the inner layer 212. As a non-limiting example the coverage of the outer layer 214 over the inner layer is between about 60% to about 88%. The reduction in the coverage allows the cable 200 to achieve torque balance and advantageously minimizes a weight of the cable 200. An interstitial void created in the outer layer 214 (e.g. between adjacent ones of the armor wires of the outer layer 214) is filled with a polymer as part of a jacket 216. In the embodiment shown, the jacket 216 encapsulates at least each of the layers 212, 214. As a non-limiting example, that jacket 216 includes a substantially smooth outer surface 218 (i.e. exterior surface) to minimize a friction coefficient thereof. It is understood that various polymers and other materials can be used to form the jacket 216. As a further non-limiting example, the smooth outer jacket 216 is bonded from the core 202 to the outer surface 218. In certain embodiments, the coefficient of friction of a material forming the jacket 216 is lower than a coefficient of friction of a material forming the interstices or insterstitial voids of the layers 212, 214. However, any materials having any coefficient of friction can be used.

In operation, the cable 200 is coupled to a tractor and/or other wellbore service equipment in a configuration known in the art. The cable 200 is introduced into the wellbore, wherein a torque on the cable 200 is substantially balanced and a friction between the cable 200 and the wellbore is minimized by the smooth outer surface 218 of the jacket 216. It is understood that various tool strings, such as the tool string 104, can be attached or coupled to the cable 200 and the tractor, such as the tractor 102, to perform various well service operations known in the art including, but not limited to, a logging operation, a mechanical service operation, or the like.

Figure 14:
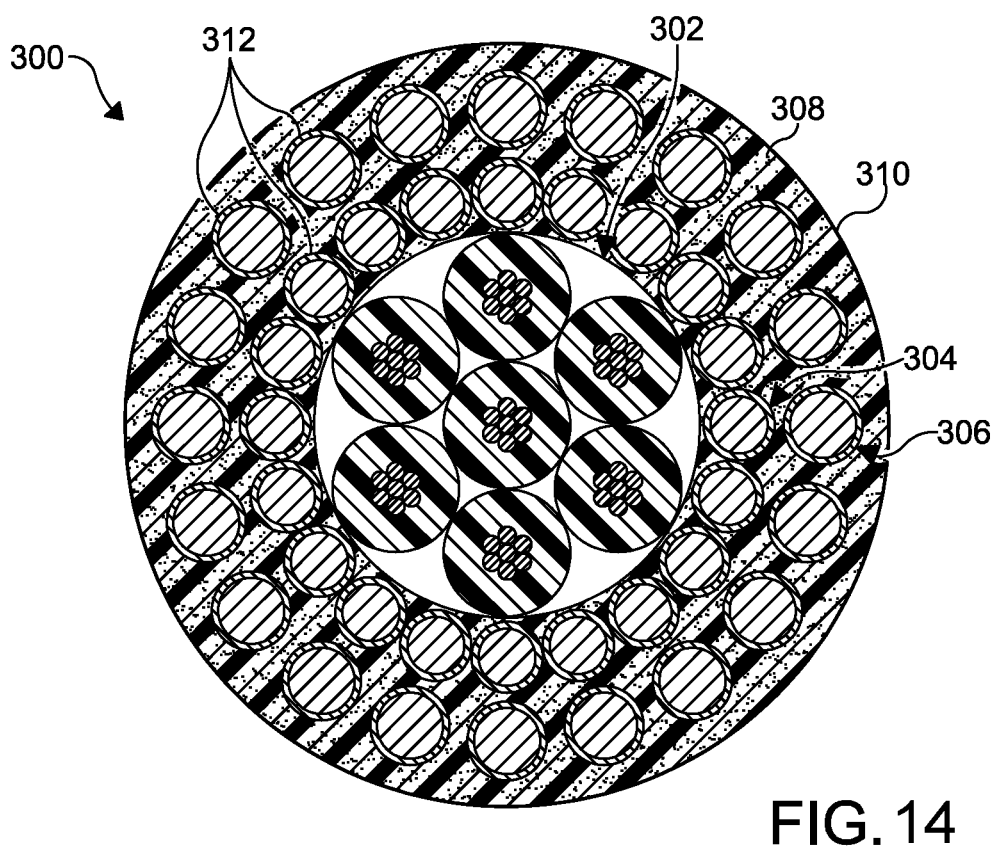

FIG. 14 illustrates a torque balanced cable 300 for downhole operations according to a second embodiment of the present invention similar to the cable 200, except as described below. As shown, the cable 300 includes a core 302, an inner layer of armor wires 304, an outer layer of armor wires 306, and a polymeric jacket 308. As a non-limiting example, the jacket 308 is formed from a fiber reinforced polymer that encapsulates each of the layers 304, 306. As a non-limiting example, the jacket 308 includes a smooth outer surface 310 to reduce a frictional coefficient thereof. It is understood that various polymers and other materials can be used to form the jacket 308.

An outer surface of each of the layers 304, 306 includes a suitable metallic coating 312 or suitable polymer coating to bond to the polymeric jacket 308. Therefore, the polymeric jacket 308 becomes a composite in which the layers 304, 306 (e.g. high modulus steel strength members) are embedded and bonded in a continuous matrix of polymer from the core 302 to the outer surface 310 of the jacket 308. It is understood that the bonding of the layers 304, 306 to the jacket 308 minimizes stripping of the jacket 308.

Figure 15:
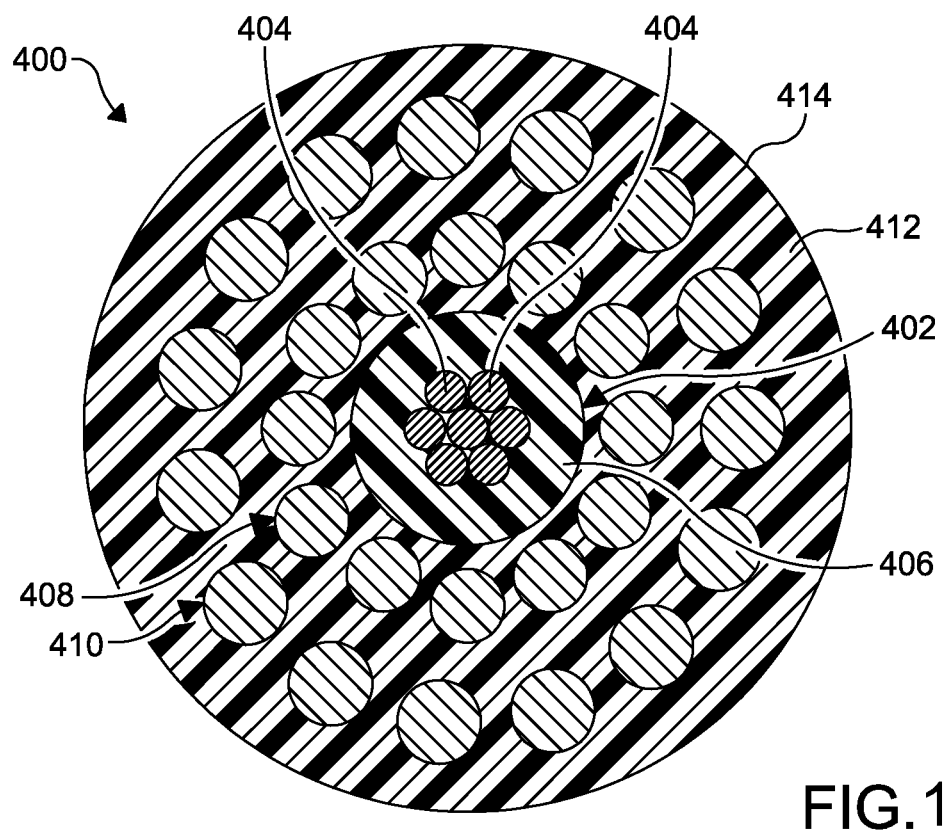

FIG. 15 illustrates a torque balanced cable 400 for downhole operations according to a third embodiment of the present invention similar to the cable 200, except as described below. As shown, the cable 400 includes a core 402 having a plurality of conductive strands 404 embedded in a polymeric insulator 406. It is understood that various materials can be used to form the conductive strands 404 and the insulator 406.

The core 402 is surrounded by an inner layer of armor wires 408 which is surrounded by an outer layer of alloy armor wires 410. An interstitial void created in the outer layer 410 (e.g. between adjacent ones of the armor wires of the outer layer 410) is filled with a polymer as part of a jacket 412. In the embodiment shown, the jacket 412 encapsulates at least each of the layers 408, 410. As a non-limiting example, the jacket 412 includes a substantially smooth outer surface 414 to minimize a friction coefficient thereof. It is understood that various polymers and other materials can be used to form the jacket 412. As a further non-limiting example, the jacket 412 is bonded to the insulator 406 disposed in the core 402. In certain embodiments, the coefficient of friction of a material forming the jacket 412 is lower than a coefficient of friction of a material forming the insulator 406. However, any materials having any coefficient of friction can be used.

Figure 16:
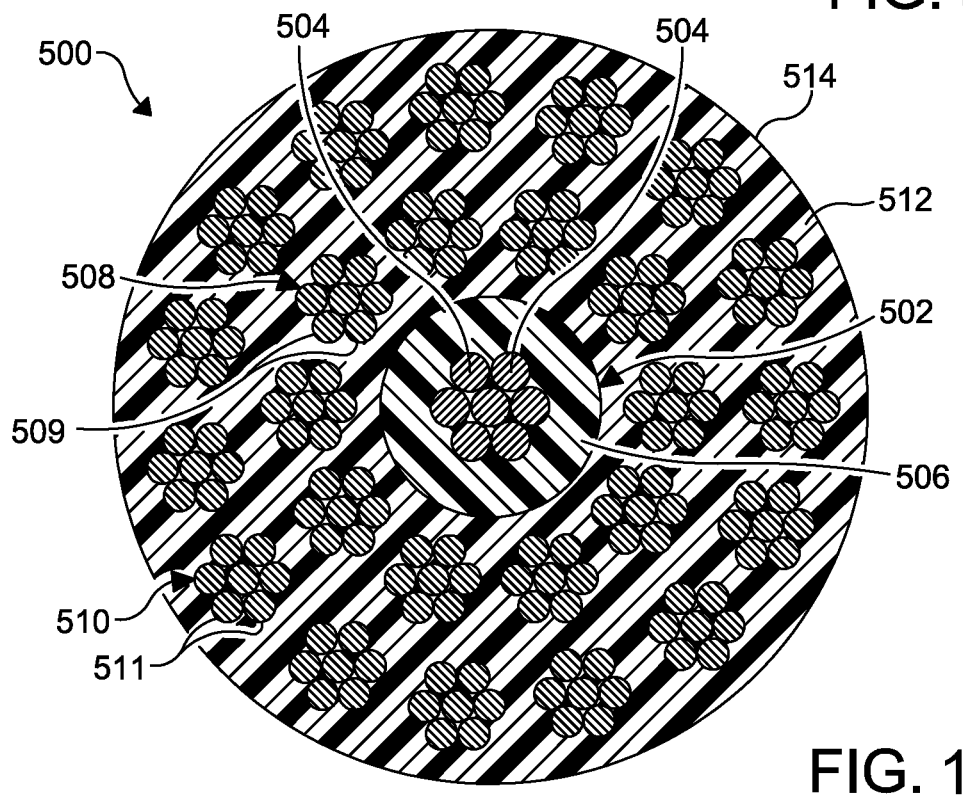

FIG. 16 illustrates a torque balanced cable 500 for downhole operations according to a fourth embodiment of the present invention similar to the cable 400, except as described below. As shown, the cable 500 includes a core 502 having a plurality of conductive strands 504 embedded in a polymeric insulator 506. It is understood that various materials can be used to form the conductive strands 504 and the insulator 506.

The core 502 is surrounded by an inner layer of armor wires 508, wherein each of the armor wires of the inner layer 508 is formed from a plurality of metallic strands 509. The inner layer 508 is surrounded by an outer layer of armor wires 510, wherein each of the armor wires of the outer layer 510 is formed from a plurality of metallic strands 511. As a non-limiting example the layers 508, 510 are contra helically wound with each other. An interstitial void created in the outer layer 510 (e.g. between adjacent ones of the armor wires of the outer layer 510) is filled with a polymer as part of a jacket 512. In the embodiment shown, the jacket 512 encapsulates at least each of the layers 508, 510. As a non-limiting example, that jacket 512 includes a substantially smooth outer surface 514 to minimize a friction coefficient thereof.

Figure 17:
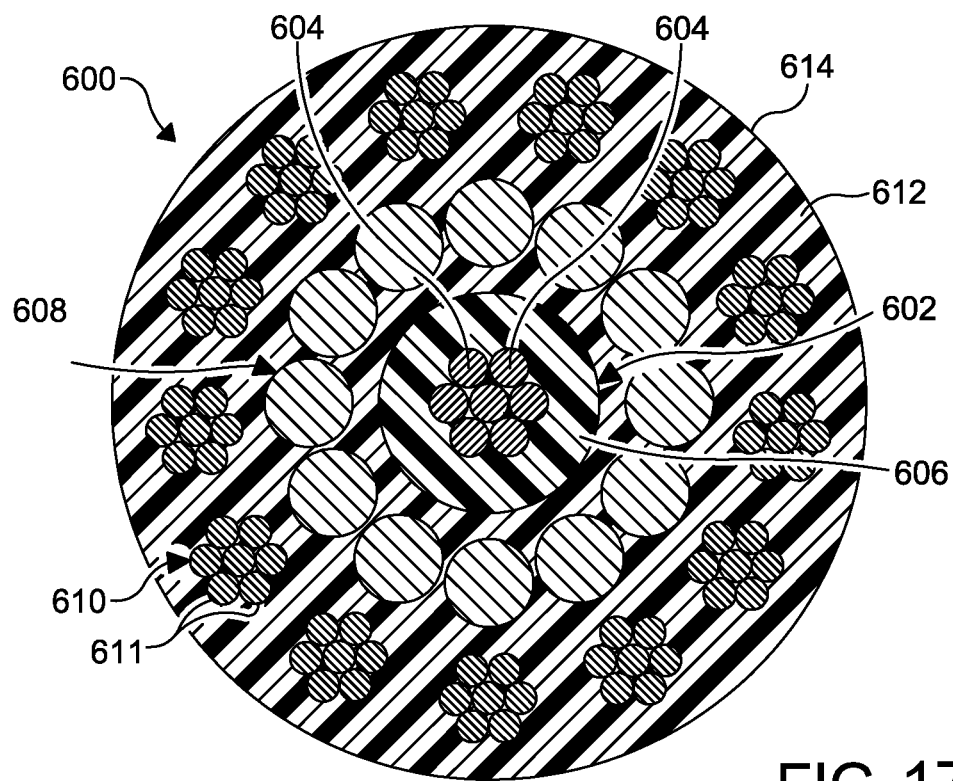

FIG. 17 illustrates a torque balanced cable 600 for downhole operations according to a fifth embodiment of the present invention similar to the cable 400, except as described below. As shown, the cable 600 includes a core 602 having a plurality of conductive strands 604 embedded in a polymeric insulator 606. It is understood that various materials can be used to form the conductive strands 604 and the insulator 606.

The core 602 is surrounded by an inner layer of armor wires 608, wherein each of the armor wires of the inner layer is formed from a single strand. The inner layer 608 is surrounded by an outer layer of armor wires 610, wherein each of the armor wires of the outer layer 610 is formed from a plurality of metallic strands 611. As a non-limiting example the layers 608, 610 are contra helically wound with each other. An interstitial void created in the outer layer 610 (e.g. between adjacent ones of the armor wires of the outer layer 610) is filled with a polymer as part of a jacket 612. In the embodiment shown, the jacket 612 encapsulates at least each of the layers 608, 610. As a non-limiting example, that jacket 612 includes a substantially smooth outer surface 614 to minimize a friction coefficient thereof.

Figure 18:
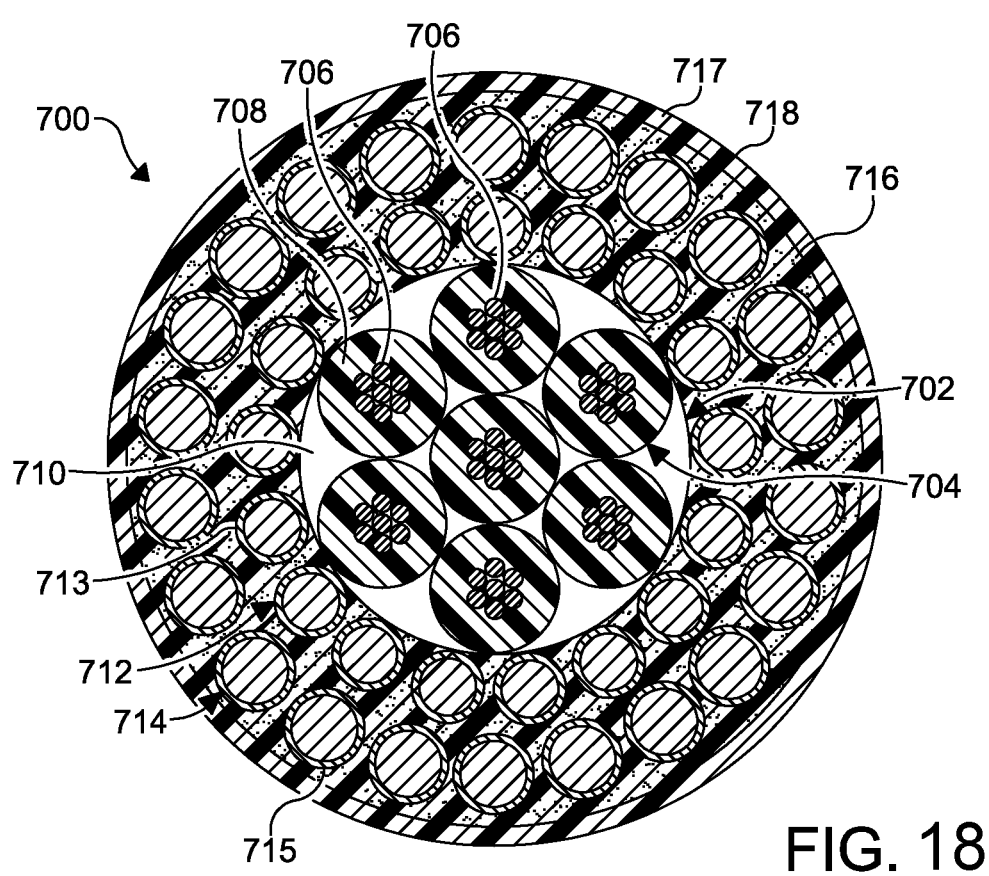

FIG. 18 illustrates a torque balanced cable 700 for downhole operations according to a sixth embodiment of the present invention similar to the cable 300, except as described below. As shown, the cable 700 includes a core 702 having a plurality of conductors 704. As a non-limiting example, each of the conductors 704 is formed from a plurality of conductive strands 706 with an insulator 708 disposed therearound. In certain embodiments an interstitial void 710 formed between adjacent insulators 708 is filled with semi-conductive or non-conductive filler (e.g. filler strands, insulated filler).

The core 702 is surrounded by an inner layer of armor wires 712 which is surrounded by an outer layer of armor wires 714. As a non-limiting example the layers 712, 714 are contra helically wound with each other. An outer surface of each of the layers 712, 714 includes a suitable metallic coating 713, 715 or suitable polymer coating to bond to a polymeric jacket 716 encapsulating each of the layers 712, 714. As a non-limiting example, at least a portion of the jacket 716 is formed from a fiber reinforced polymer.

In the embodiment shown, an outer circumferential portion 717 of the jacket 716 (e.g. 1 to 15 millimeters) is formed from polymeric material without reinforcement fibers disposed therein to provide a smooth outer surface 718. As a non-limiting example, the outer circumferential portion 717 may be formed from virgin polymeric material or polymer materials amended with other additives to minimize a coefficient of friction. As a further non-limiting example, a non-fiber reinforced material is disposed on the jacket 716 and chemically bonded thereto.

Figure 19:
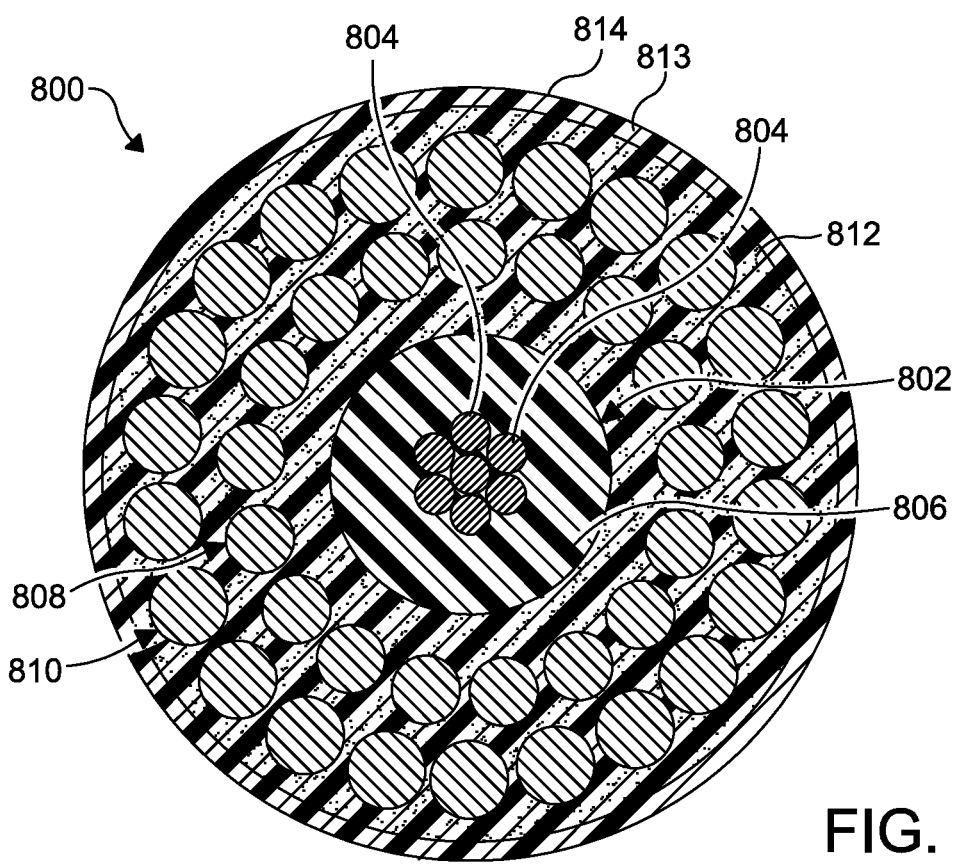

FIG. 19 illustrates a torque balanced cable 800 for downhole operations according to a seventh embodiment of the present invention similar to the cable 400, except as described below. As shown, the cable 800 includes a core 802 having a plurality of conductive strands 804 embedded in a polymeric insulator 806. It is understood that various materials can be used to form the conductive strands 804 and the insulator 806.

The core 802 is surrounded by an inner layer of armor wires 808. The inner layer 808 is surrounded by an outer layer of armor wires 810. As a non-limiting example the layers 808, 810 are contra helically wound with each other. An interstitial void created in the outer layer 810 (e.g. between adjacent ones of the armor wires of the outer layer 810) is filled with a polymer as part of a jacket 812. As a non-limiting example, at least a portion of the jacket 812 is formed from a fiber reinforced polymer. As a further non-limiting example, the jacket 812 encapsulates at least each of the layers 808, 810.

In the embodiment shown, an outer circumferential portion 813 of the jacket 812 (e.g. 1 to 15 millimeters) is formed from polymeric material without reinforcement fibers disposed therein to provide a smooth outer surface 814. As a non-limiting example, the outer circumferential portion 813 may be formed from virgin polymeric material or polymer materials amended with other additives to minimize a coefficient of friction. As a further non-limiting example, a non-fiber reinforced material is disposed on the jacket 812 and chemically bonded thereto.

Figure 20:
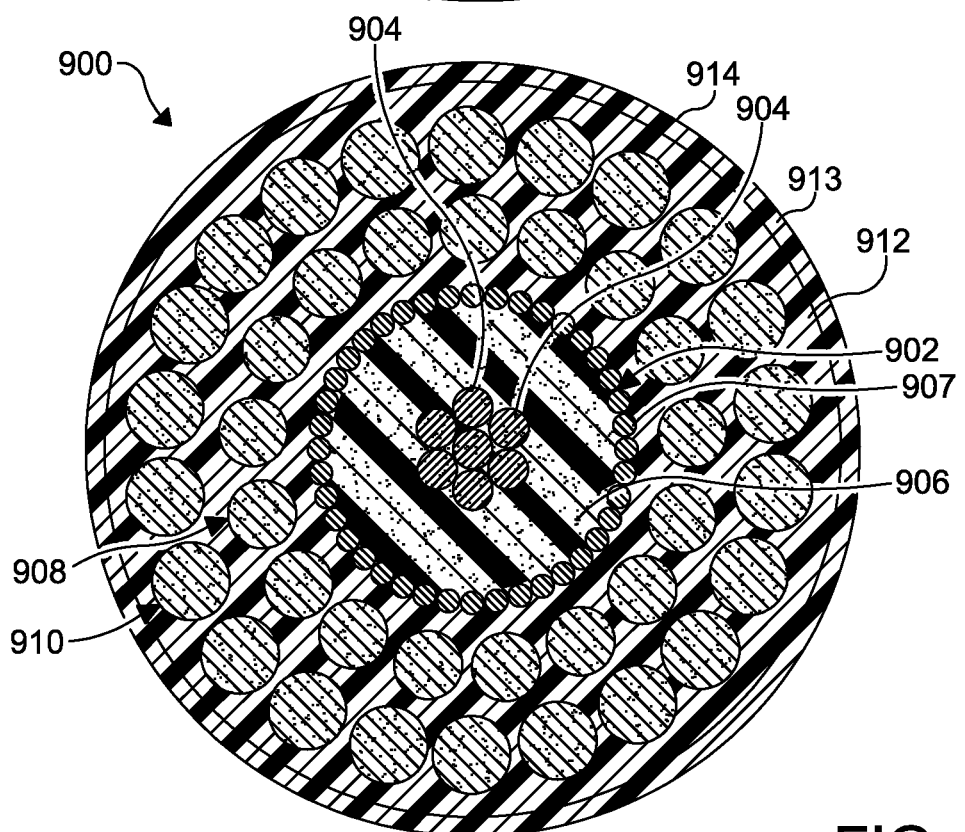

FIG. 20 illustrates a torque balanced cable 900 for downhole operations according to an eighth embodiment of the present invention similar to the cable 400, except as described below. As shown, the cable 900 includes a core 902 having a plurality of conductive strands 904 embedded in a polymeric insulator 906. It is understood that various materials can be used to form the conductive strands 904 and the insulator 906. The core 902 includes an annular array of shielding wires 907 circumferentially disposed adjacent a periphery of the core 902, similar to conventional coaxial cable configurations in the art. As a non-limiting example, the shielding wires 907 are formed from copper. However, other conductors can be used.

The core 902 and the shielding wires 907 are surrounded by an inner layer of armor wires 908. The inner layer 908 is surrounded by an outer layer of armor wires 910. As a non-limiting example the layers 908, 910 are contra helically wound with each other. An interstitial void created in the outer layer 910 (e.g. between adjacent ones of the armor wires of the outer layer 910) is filled with a polymer as part of a jacket 912. As a non-limiting example, at least a portion of the jacket 912 is formed from a fiber reinforced polymer. In the embodiment shown, the jacket 912 encapsulates at least each of the layers 908, 910.

In the embodiment shown, an outer circumferential portion 913 of the jacket 912 (e.g. 1 to 15 millimeters) is formed from polymeric material without reinforcement fibers disposed therein to provide a smooth outer surface 914. As a non-limiting example, the outer circumferential portion 913 may be formed from virgin polymeric material or polymer materials amended with other additives to minimize a coefficient of friction. As a further non-limiting example, a non-fiber reinforced material is disposed on the jacket 912 and chemically bonded thereto.

Figure 21:
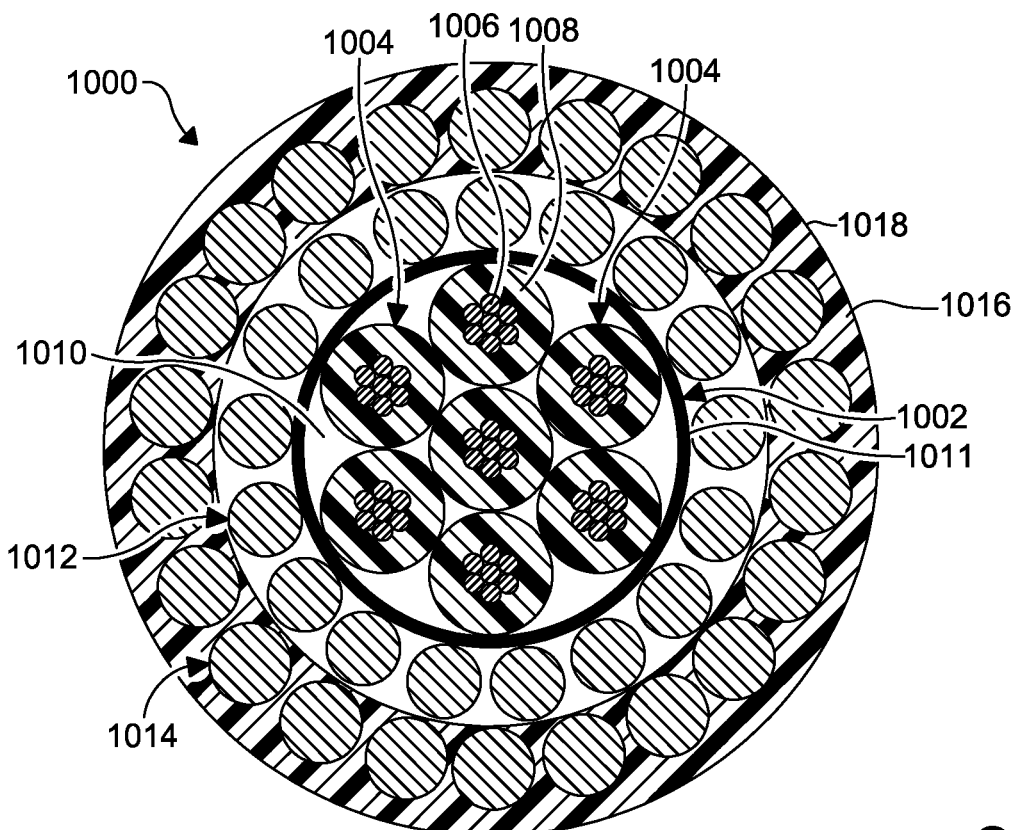

FIG. 21 illustrates a torque balanced cable 1000 for downhole operations according to a ninth embodiment of the present invention similar to the cable 200, except as described below. As shown, the cable 1000 includes a core 1002 having a plurality of conductors 1004. As a non-limiting example, each of the conductors 1004 is formed from a plurality of conductive strands 1006 with an insulator 1008 disposed therearound. In certain embodiments an interstitial void 1010 formed between adjacent insulators 1008 is filled with semi-conductive or non-conductive filler (e.g. filler strands, insulator filler). As a further non-limiting example, a layer of insulative material 1011 (e.g. polymer) is circumferentially disposed around the core 1002.

The core 1002 and the insulative material 1011 are surrounded by an inner layer of armor wires 1012 which is surrounded by an outer layer of armor wires 1014. A polymer jacket 1016 is circumferentially disposed (e.g. pressure extruded) on to the outer layer 1014 to fill an interstitial void between the members of the outer layer 1014. As a non-limiting example, that jacket 1016 includes a substantially smooth outer surface 1018 to minimize a friction coefficient thereof. As shown, the jacket 1016 is applied only on the outer layer 1014 and does not abut the core 1002 or the layer of insulative material 1011. In certain embodiments, the jacket 1016 is not chemically or physically bonded to the members of the outer layer 1014. As shown in FIG. 21, the inner armor layer of armor wirers 1012 are separated from the outer layer of armor wirers 1014, and the interstitial spaces between the armor wirers of the outer armor wires 1014 are substantially filed with a polymer.

Figure 22:
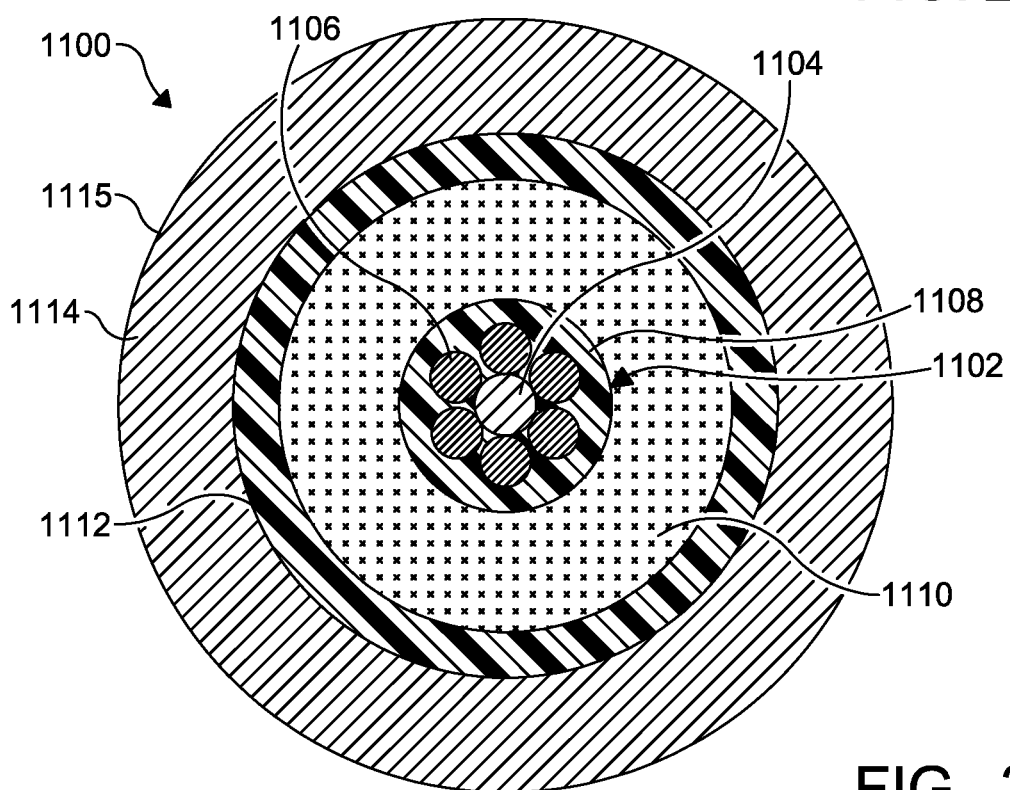

FIG. 22 illustrates a torque balanced cable 1100 for downhole operations according to a tenth embodiment of the present invention. As shown, the cable 1100 includes a core 1102 having an optical fiber 1104 centrally disposed therein. A plurality of conductive strands 1106 are disposed around the optical fiber 1104 and embedded in an insulator 1108. The core 1102 may comprise more than one optical fiber 1104 and/or conductive strands 1106 to define multiple power and telemetry paths for the cable 1100.

The core 1102 is surrounded by an inner strength member layer 1110 which is typically formed from a composite long fiber reinforced material such as a UN-curable or thermal curable epoxy or thermoplastic. As a non-limiting example, the inner armor layer 1110 is pultruded or rolltruded over the core 1102. As a further non-limiting example, a second layer (not shown) of virgin, UN-curable or thermal curable epoxy is extruded over the inner armor layer 1110 to create a more uniformly circular profile for the cable 1100.

A polymeric jacket 1112 may be extruded on top of the inner strength member layer 1110 to define a shape (e.g. round) of the cable 1100. An outer metallic tube 1114 is drawn over the jacket 1112 to complete the cable 1100. As a non-limiting example, the outer metallic tube 1114 includes a substantially smooth outer surface 1115 to minimize a friction coefficient thereof. The outer metallic tube 1114 and the inner armor layer 1110 advantageously act together or independently as strength members. Each of the inner strength member layer 1110 and the outer metallic tube 1114 are at zero lay angles, therefore, the cable 1100 is substantially torque balanced.

Figure 23:
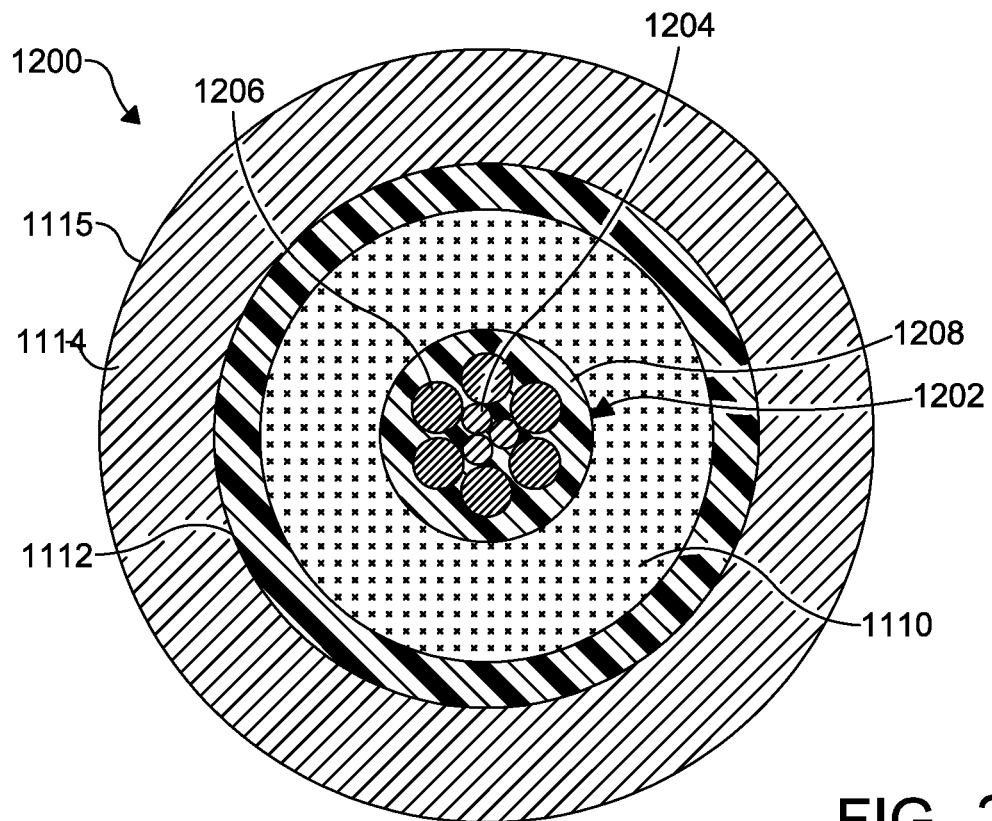

FIG. 23 illustrates a torque balanced cable 1200 for downhole operations according to an eleventh embodiment of the present invention similar to the cable 1100, except as described below. As shown, the cable 1200 includes a core 1202 having a plurality of optical fibers 1204 disposed therein. A plurality of conductive strands 1206 are disposed around the optical fibers 1204 and embedded in an insulator 1208. The core 1202 may comprise more than one optical fiber 1204 and/or conductive strands 1206 to define multiple power and telemetry paths for the cable 1200.

Figure 24:
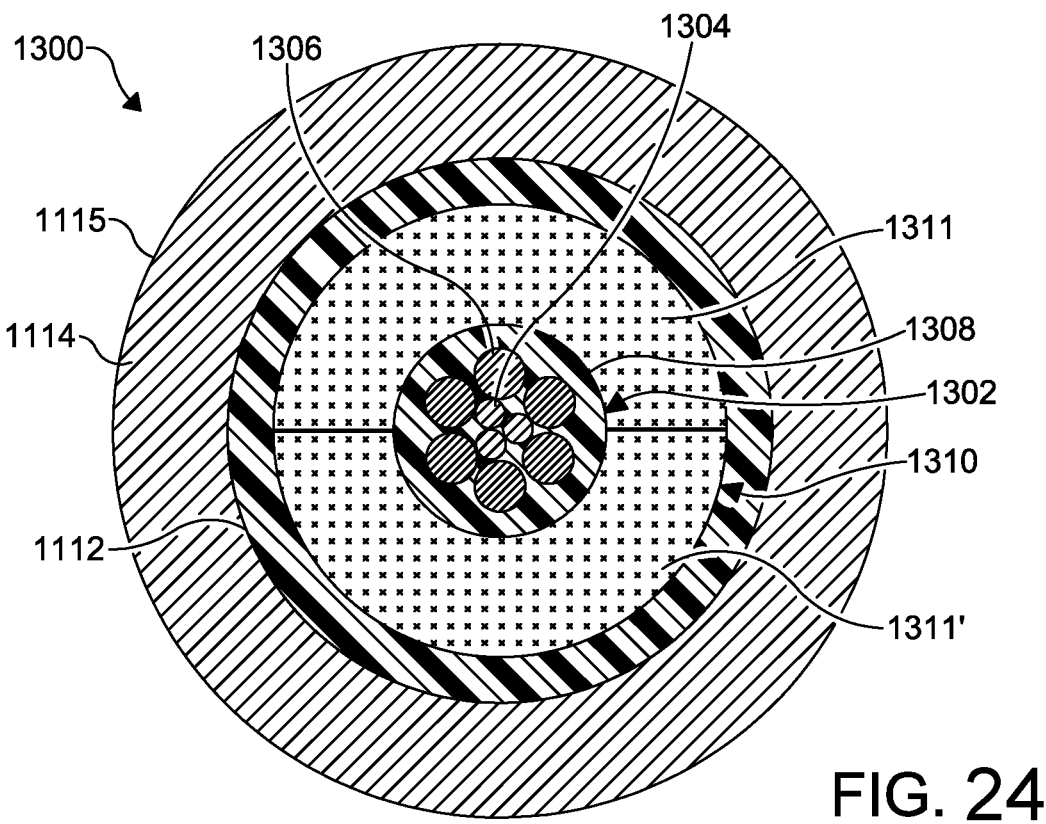

FIG. 24 illustrates a torque balanced cable 1300 for downhole operations according to a twelfth embodiment of the present invention similar to the cable 1100, except as described below. As shown, the cable 1300 includes a core 1302 having a plurality of optical fibers 1304 disposed therein. A plurality of conductive strands 1306 are disposed around a configuration of the optical fibers 1304 and embedded in an insulator 1308.

The core 1302 is surrounded by an inner strength member layer 1310 which is typically formed from a composite long fiber reinforced material such as a UN-curable or thermal curable epoxy or thermoplastic. As a non-limiting example, the inner armor layer 1310 is pultruded or rolltruded over the core 1302. As a further non-limiting example, the inner armor layer 1310 is formed as a pair of strength member sections 1311, 1311', each of the sections 1311, 1311' having a semi-circular shape when viewed in axial cross-section.

Figure 25:
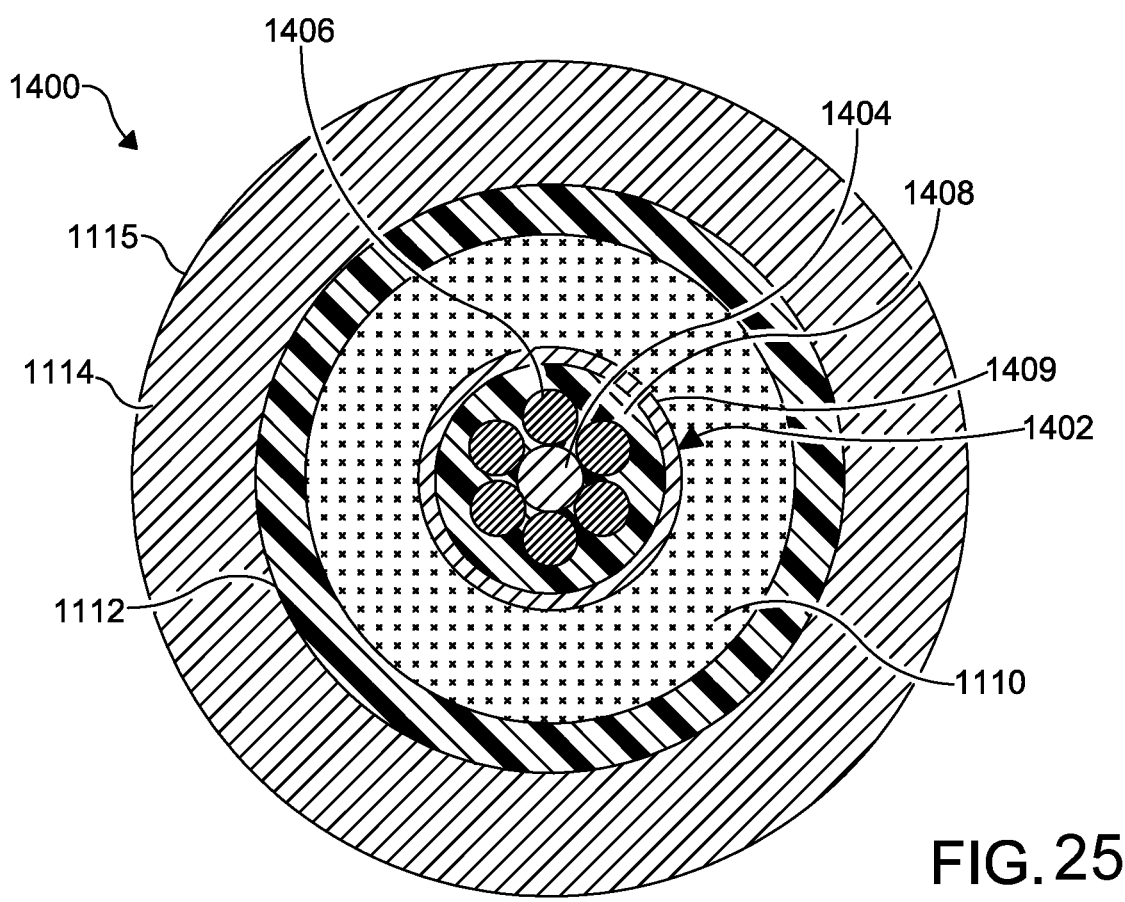

FIG. 25 illustrates a torque balanced cable 1400 for downhole operations according to a thirteenth embodiment of the present invention similar to the cable 1100, except as described below. As shown, the cable 1400 includes a core 1402 having an optical fiber 1404 centrally disposed therein. A plurality of conductive strands 1406 are disposed around the optical fiber 1404 and embedded in an insulator 1408. The core 1402 is surrounded by an inner metallic tube 1409 having a lay angle of substantially zero. It is understood that the inner metallic tube 1409 can have any size and thickness and may be utilized as a return path for electrical power.

The polymeric materials useful in the cables of the invention may include, by nonlimiting example, polyolefins (such as EPC or polypropylene), other polyolefins, polyaryletherether ketone (PEEK), polyaryl ether ketone (PEK), polyphenylene sulfide (PPS), modified polyphenylene sulfide, polymers of ethylene-tetrafluoroethylene (ETFE), polymers of poly(1,4-phenylene), polytetrafluoroethylene (PTFE), perfluoroalkoxy (PFA) polymers, fluorinated ethylene propylene (FEP) polymers, polytetrafluoroethylene-perfluoromethylvinylether (MFA) polymers, Parmax®, any other fluoropolymer, and any mixtures thereof. The long fiber used in the composite of UN-curable or thermal curable epoxy or thermoplastic may be carbon fiber, glass fiber, or any other suitable synthetic fiber.

Embodiments disclosed herein describe a method and a cable design for use of a wireline cable comprising a torque balanced armor wire and very smooth, low coefficient of friction outer surface to be attached to a tractor that will reduce the weight the tractor has to carry, lower the friction the tractor has to overcome to pull the cable and the tool string through the wellbore and to avoid knotting and birdcaging associated with sudden loss of tension on the wireline cable in such operations.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A smooth torque balanced cable, comprising:
   an electrically conductive cable core for transmitting electrical power, the cable core having a plurality of conductive strands embedded in a polymeric insulator;
   a first polymer surrounding the cable core;
   a second polymer surrounding the first polymer;
   an inner layer of a plurality of first armor wires surrounding said cable core, said first armor wires being at least in partial contact with the second polymer disposed opposite the first polymer, the cable core polymeric insulator having a higher melting point than a processing temperature of the first polymer and the second polymer; and
   an outer layer of a plurality of second armor wires surrounding said inner layer contrahelically, said second armor wires having a stranded configuration, wherein interstitial spaces between the second armor wires are at least partially filled with a jacket, and wherein the outer layer of the plurality of second armor wires is encapsulated by the jacket, and wherein the jacket comprises ethylene-tetrafluoroethylene, and wherein coverage of the outer layer of armor wires over the inner layer of armor wires is less than or approximately equal to 88 percent, and wherein the second polymer separates the plurality of first armor wires from the plurality of second armor wires;
   wherein a diameter of each wire of the plurality of second armor wires is less than a diameter of each wire of the plurality of first armor wires;
   wherein the diameter of each wire of the plurality of second armor wires is from 0.025 inches to 0.05 inches, and wherein the diameter of each wire of the plurality of first armor wires is 0.04 inches to 0.07 inches;
   wherein a number of armor wires in the outer layer of the plurality of second armor wires is greater than a number of armor wires in the inner layer of the plurality of first armor wires;
   wherein the cable is coupled to a tool string including a tractor device.

2. The cable of claim 1, wherein said first armor wires carry approximately 60 percent of a load applied to the cable.

3. The cable of claim 1, wherein at least a portion of the ethylene-tetrafluoroethylene is carbon-fiber reinforced.

4. The cable of claim 1, wherein the first polymer is fluorinated ethylene propylene.

5. The cable of claim 1, wherein the second polymer is ethylene-tetrafluoroethylene.

6. The cable of claim 1, wherein the jacket is not chemically or physically bonded to armor wirers of the plurality of the second armor wires.

7. The cable of claim 1, wherein the first polymer is bonded with the second polymer and the second polymer is bonded with the jacket.

8. The cable of claim 1, wherein the first polymer comprises fluorinated ethylene propylene, and the second polymer comprises ethylene-tetrafluoroethylene, and wherein both the second polymer and jacket also comprise carbon-fibers.

9. The cable of claim 1, further comprising at least one optical fiber in the electrically conductive cable core.

10. The cable of claim 1, further comprising annular array of shielding wires circumferentially disposed adjacent a periphery of the core.

11. The cable of claim 1, wherein coverage of the outer layer of armor wires over the inner layer of armor wires is from about 60 percent to about 88 percent.

12. A smooth torque balanced cable, comprising:
- at least one optical fiber;
- an electrically conductive cable core for transmitting electrical power, the cable core having a plurality of conductive strands embedded in a polymeric insulator;
- a first polymer surrounding the cable core;
- a second polymer surrounding the first polymer;
- an inner layer of a plurality of first armor wires surrounding said cable core, said first armor wires being at least in partial contact with the second polymer disposed opposite the first polymer, the cable core polymeric insulator having a higher melting point than a processing temperature of the first polymer and the second polymer; and
- an outer layer of a plurality of second armor wires surrounding said inner layer contrahelically, wherein interstitial spaces between the second armor wires are at least partially filled with a jacket, and wherein the outer layer of the plurality of second armor wires is encapsulated by the jacket, and wherein coverage of the outer layer of armor wires over the inner layer of armor wires is less than or approximately equal to 88 percent, and wherein the second polymer separates the plurality of first armor wires from the plurality of second armor wires;
- wherein a diameter of each wire of the plurality of second armor wires is less than a diameter of each wire of the plurality of first armor wires;
- wherein the diameter of each wire of the plurality of second armor wires is from 0.025 inches to 0.05 inches, and wherein the diameter of each wire of the plurality of first armor wires is 0.04 inches to 0.07 inches;
- wherein a number of armor wires in the outer layer of the plurality of second armor wires is greater than a number of armor wires in the inner layer of the plurality of first armor wires;
- wherein the cable is coupled to a tool string including a tractor device.

\* \* \* \* \*